US009799116B2

United States Patent
Kafuku

(10) Patent No.: US 9,799,116 B2
(45) Date of Patent: Oct. 24, 2017

(54) DRAWING APPARATUS AND METHOD FOR ACQUIRING INCLINATION OF NAIL

(71) Applicant: CASIO COMPUTER CO., LTD., Shibuya-ku, Tokyo (JP)

(72) Inventor: Shigeru Kafuku, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/064,425

(22) Filed: Mar. 8, 2016

(65) Prior Publication Data

US 2016/0270506 A1    Sep. 22, 2016

(30) Foreign Application Priority Data

Mar. 18, 2015    (JP) .................................. 2015-054435

(51) Int. Cl.
| | |
|---|---|
| *G06K 15/22* | (2006.01) |
| *G06T 7/00* | (2017.01) |
| *A45D 29/00* | (2006.01) |
| *G06T 7/73* | (2017.01) |

(52) U.S. Cl.
CPC .............. *G06T 7/004* (2013.01); *A45D 29/00* (2013.01); *G06T 7/73* (2017.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 5,931,166 | A * | 8/1999 | Weber .................... | A45D 34/04 132/200 |
| 6,035,860 | A * | 3/2000 | Mombourquette .... | A45D 29/00 132/200 |
| 6,067,996 | A * | 5/2000 | Weber .................... | A45D 34/04 132/200 |
| 6,169,605 | B1 * | 1/2001 | Penn .................... | B29C 67/0059 358/1.1 |
| 6,286,517 | B1 * | 9/2001 | Weber .................... | A45D 29/00 132/200 |
| 6,525,724 | B1 * | 2/2003 | Takami .................. | A45D 29/00 345/418 |
| 6,668,099 | B1 * | 12/2003 | Nikitin ................ | G03F 7/70616 382/286 |
| 9,386,834 | B2 * | 7/2016 | Bitoh ..................... | A45D 29/00 |
| 2006/0017937 | A1 * | 1/2006 | Vaccaro ............. | G01N 21/8806 356/607 |

(Continued)

FOREIGN PATENT DOCUMENTS

| | | |
|---|---|---|
| CN | 104287411 A | 1/2015 |
| JP | 2003534083 A | 11/2003 |

OTHER PUBLICATIONS

Chinese Office Action (and English translation thereof) dated Apr. 27, 2017, issued in counterpart Chinese Application No. CN 201610152832.4.

*Primary Examiner* — Ted Barnes
(74) *Attorney, Agent, or Firm* — Holtz, Holtz & Volek PC

(57) ABSTRACT

A drawing apparatus includes a mounting section where an object having a nail is mounted, and an inclination detection unit that detects a degree of an inclination of the nail in a width direction of the nail with respect to a reference state of the nail based on a shape of at least one target image along the width direction of the object, the target image being formed on the object.

17 Claims, 12 Drawing Sheets

(56) References Cited

U.S. PATENT DOCUMENTS

| | | | | |
|---|---|---|---|---|
| 2010/0069744 A1* | 3/2010 | Simpkin | A61B 5/0507 | |
| | | | 600/425 | |
| 2012/0015457 A1* | 1/2012 | Rawlinson | H01L 24/75 | |
| | | | 438/15 | |
| 2012/0274683 A1* | 11/2012 | Yamasaki | B41J 3/4073 | |
| | | | 347/2 | |
| 2012/0287183 A1* | 11/2012 | Bitoh | A45D 29/00 | |
| | | | 347/3 | |
| 2014/0207411 A1* | 7/2014 | Laurent | G01B 11/30 | |
| | | | 702/159 | |
| 2014/0327760 A1* | 11/2014 | Kurz | H04N 5/332 | |
| | | | 348/135 | |
| 2015/0007841 A1* | 1/2015 | Yamasaki | A45D 29/00 | |
| | | | 132/73.5 | |
| 2015/0020834 A1* | 1/2015 | Bitoh | A45D 29/00 | |
| | | | 132/200 | |
| 2015/0201734 A1* | 7/2015 | Yamasaki | A45D 34/04 | |
| | | | 132/200 | |
| 2015/0377606 A1* | 12/2015 | Thielemans | G01B 21/047 | |
| | | | 356/625 | |
| 2016/0088197 A1* | 3/2016 | Yamasaki | H04N 5/225 | |
| | | | 132/73.6 | |
| 2016/0167396 A1* | 6/2016 | Chang | B41J 3/4073 | |
| | | | 347/37 | |

* cited by examiner

Lc (LEFT SIDE)

Lc (RIGHT SIDE INVERTED)

Lc (INVERTED RIGHT AND LEFT SIDES SUPERIMPOSED)

Lc (LEFT SIDE)

Lc (RIGHT SIDE INVERTED)

Lc (INVERTED RIGHT AND LEFT SIDES SUPERIMPOSED)

DRAWING APPARATUS AND METHOD FOR ACQUIRING INCLINATION OF NAIL

CROSS-REFERENCE TO RELATED APPLICATIONS

A corresponding Japanese application is:
Application number: JP 2015-054435 A, Date of Filing: Mar. 18, 2015

BACKGROUND OF THE INVENTION

1. Field of the Invention

The present invention relates to a drawing apparatus and a method for detecting the inclination of a nail in the drawing apparatus.

2. Description of the Related Art

A drawing apparatus that draws a nail design on a nail has conventionally been known. Such a drawing apparatus is described in, for example, JP 2003-534083 T. The use of such a drawing apparatus makes it possible to enjoy a nail design easily without going to a nail salon or the like.

A drawing apparatus for nail printing has a structure where a finger having a nail on which a nail design is intended to be drawn is inserted into the drawing apparatus. Here, a sheet of paper and the like that are a normal printer's drawing targets do not incline normally. However, in such a drawing apparatus for nail printing, for example, the finger inserted in the drawing apparatus may rotate about an axis in the finger's extending direction to make the nail of the finger inclined with respect to a proper state that the nail is not inclined, with respect to the width direction. When the nail is inclined in this manner, if the nail design is drawn on the nail as it is without being aware of the inclined nail, the design drawn on the nail may be lopsided or distorted and its finish may not look beautiful.

Hence, when the nail is rotated about the axis of the finger extending direction and is inclined, it is preferable to take steps of, for example, correcting drawing data in accordance with the state of the inclination of the nail and then drawing, or prompting a user to stop the drawing operation, reset the finger, and try not to incline the nail.

The drawing apparatus for nail printing conventionally has a configuration to take a picture of a nail from above and has a configuration to detect the outline of the nail from the picture obtained by imaging. However, it is difficult to accurately detect the degree of the inclination of the nail, the inclination having been caused by the rotation about the axis in the finger's extending direction, in the picture imaged in this manner.

BRIEF SUMMARY OF THE INVENTION

The present invention has an advantage that can provide a drawing apparatus and method for detecting the inclination of a nail that can detect the degree of the inclination of the nail with accuracy with a relatively simple configuration and accordingly can draw excellently on the nail.

According to an embodiment of the present invention, there is provided a drawing apparatus including: a mounting section where an object is mounted, the object being a finger or a toe having a nail; and an inclination detection unit configured to detect a degree of an inclination of the nail in a width direction of the nail with respect to a reference state of the nail based on a shape of at least one target image along the width direction of the object, the target image being formed on the object mounted on the mounting section.

According to an embodiment of the present invention, there is provided a method for detecting inclination of a nail in a drawing apparatus, wherein the drawing apparatus includes a mounting section where an object is mounted, the object being a finger or a toe having the nail, the method including: an inclination detection step of detecting a degree of an inclination of the nail in a width direction of the nail with respect to a reference state of the nail based on a shape of at least one target image along the width direction of the object, the target image being formed on the object mounted on the mounting section along the width direction.

DETAILED DESCRIPTION OF THE INVENTION

Figure 1:
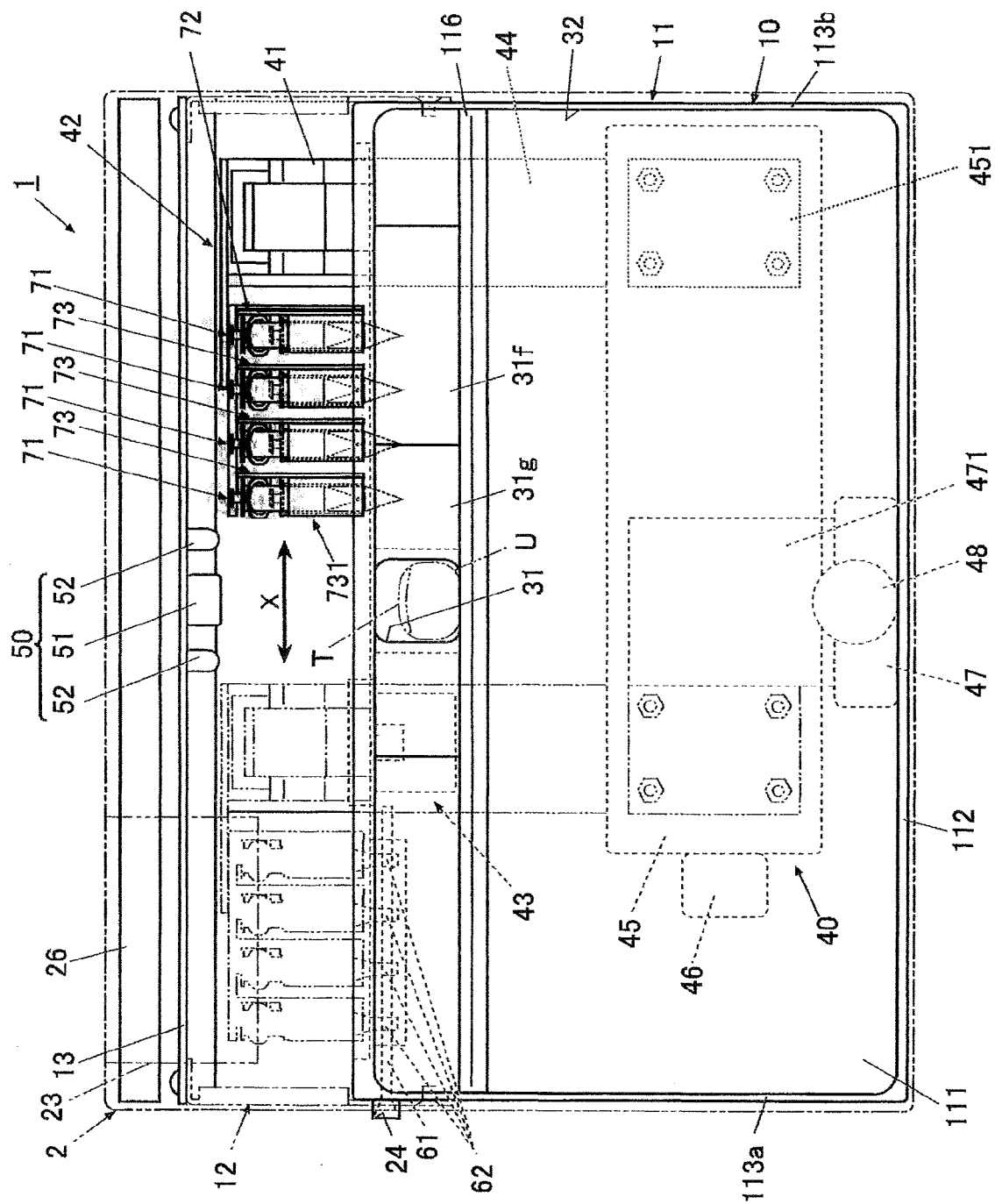
FIG. 1 is a front view of a drawing apparatus according to the embodiment.

An embodiment of a drawing apparatus and a method for detecting the inclination of a nail in the drawing apparatus according to the present invention is described in detail hereinafter with reference to the drawings.

The scope of the invention is not limited to the illustrated examples.

In the following embodiment, a description is given assuming that the drawing apparatus draws on a fingernail of the hand setting the fingernail as a drawing target. However, the drawing target of the present invention is not limited to the fingernail of the hand. For example, a toenail of the foot may be targeted for drawing.

FIG. 1 is a front view of the drawing apparatus.

Figure 2:
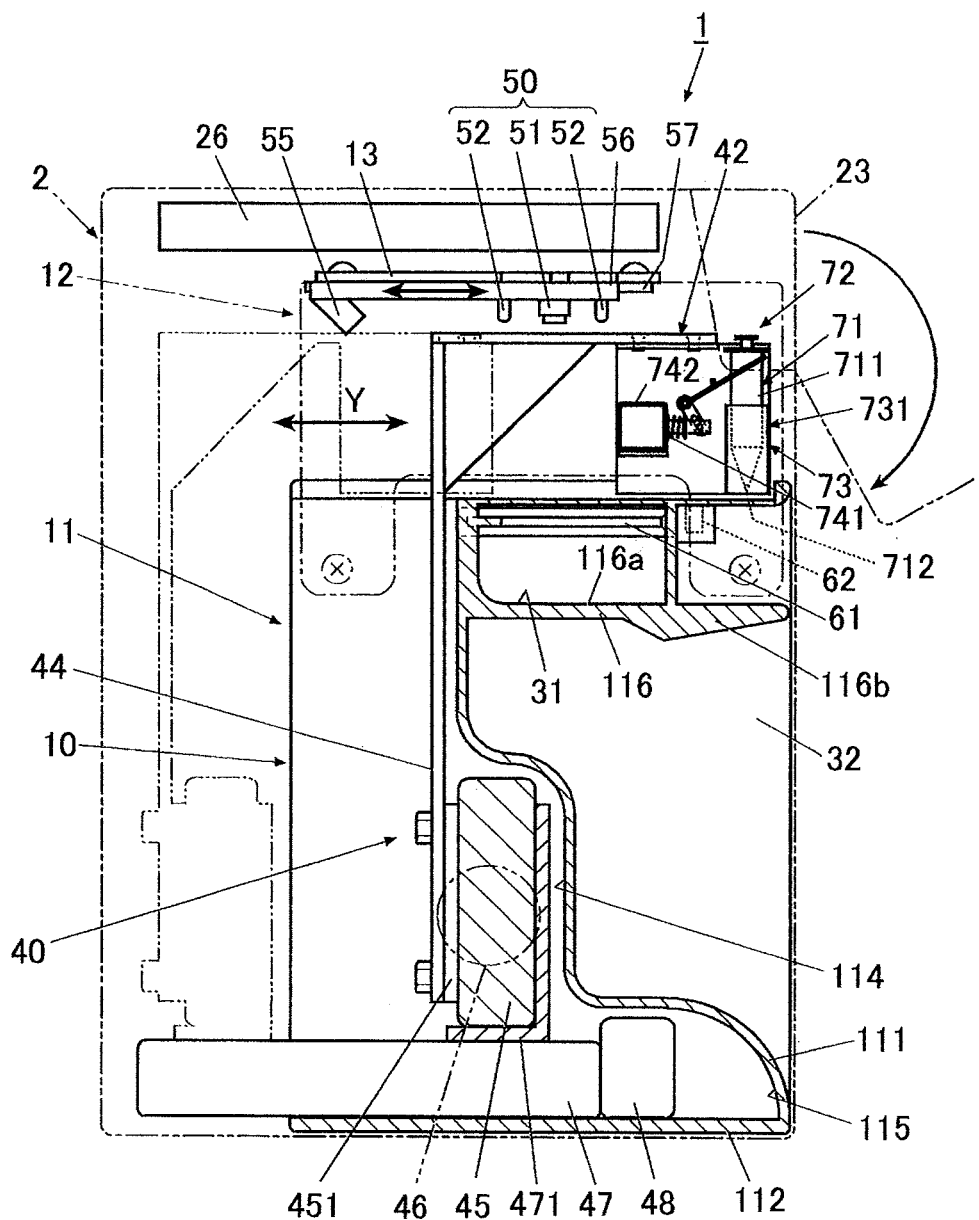
FIG. 2 is a side cross-sectional view illustrating, in cross section, an internal configuration of part of the drawing apparatus illustrated in FIG. 1.

FIG. 2 is a side view illustrating, in cross section, an internal configuration of part of the drawing apparatus illustrated in FIG. 1.

As illustrated in FIGS. 1 and 2, a drawing apparatus 1 is a hybrid nail printing apparatus including a drawing head 41 that ejects a drawing material such as ink to draw, and a drawing tool 71 configured of, for example, a writing instrument such as a pen to draw in contact with a drawing target while applying the drawing material such as ink. The drawing apparatus 1 includes a case body 2, and an apparatus body 10 housed in the case body 2. In FIGS. 1 and 2, the case body is indicated by a chain double-dashed line.

A drawing tool replacement purpose cover unit 23 configured to be openable/closable to replace the drawing tool 71 of a drawing unit 40 described below is provided at an upper end on a front surface of the case body 2. The drawing tool replacement purpose cover unit 23 is pivotable on, for example, a hinge from a closed state to an open state as illustrated in FIG. 2.

Furthermore, a medium insertion/removal port 24 where a drawn medium to be mounted on a drawing tool break-in section 61 described below can be replaced is formed at a position on one side surface (a left side surface in FIG. 1 in the embodiment) of the case body 2, the position corresponding to the drawing tool break-in section 61.

An operating unit 25 (see FIG. 5) is installed on a top surface (top) of the case body 2.

The operating unit 25 is an input unit that allows a user to perform various input operations.

Unillustrated operation buttons for performing various input operations, such as a power switch button to turn on the power to the drawing apparatus 1, a stop switch button to stop the operation, a design selection button to select a design image to be drawn on a nail T, and a drawing start button to instruct the start of drawing, are placed on the operating unit 25.

A display unit 26 is installed in a substantially central portion of the top surface (top) of the case body 2.

The display unit 26 includes, for example, a liquid crystal display (LCD: Liquid Crystal Display), an organic electroluminescence display, or any other flat display.

In the embodiment, for example, a finger image (an image of a print finger U1 including an image of the nail T) obtained by imaging the print finger U1, an image of the contour and the like of the nail T included in the finger image, a design selection screen for selecting a design image to be drawn on the nail T, a thumbnail image for a design check, and an instruction screen for displaying various instructions are displayed on the display unit 26, as appropriate.

Especially in the embodiment, if it is determined that the inclination of the nail T exceeds an allowable range in an inclination detection unit 812b by an evaluation value calculated by the inclination detection unit 812b (see FIG. 5) described below, it is designed to display a message, for example, to prompt the user to reset the finger, on a display screen of the display unit 26.

The display unit 26 functions as a notification unit that notifies the user of a matter which the degree of the inclination of the nail T exceeds the allowable range when the degree of the inclination of the nail T exceeds the allowable range.

A touch panel may be integrally formed on the surface of the display unit 26. In this case, various selections and instructions can be made by touching the surface of the touch panel with, for example, the finger tip. It is configured such that various input operations can also be performed by a touch operation of touching the surface of the display unit 26 with, for example, a stylus pen or pointed rod-like writing instrument other than the finger tip.

The apparatus body 10 includes a lower machine casing 11 formed into a substantially box shape and installed in a lower part inside the case body 2, and an upper machine casing 12 installed above the lower machine casing 11 in an upper part inside the case body 2.

Firstly, the lower machine casing 11 is described.

The lower machine casing 11 includes a back plate 111, a bottom plate 112, a pair of left and right side plates 113a and 113b, an X-direction moving stage housing section 114, a Y-direction moving stage housing section 115, and a dividing wall 116.

Lower ends of the side plates 113a and 113b are respectively coupled to both of left and right ends of the bottom plate 112. The side plates 113a and 113b are provided in a standing manner with respect to the bottom plate 112.

As illustrated in FIG. 2, a lower part of the back plate 111 is formed in such a manner as to be recessed toward the front (frontward in a finger insertion direction) in two stages.

A lower end of the back plate 111 is coupled to a front end of the bottom plate 112. The back plate 111 partitions an area surrounded by the bottom plate 112 and the side plates 113a and 113b into front and back spaces.

The space formed behind the recessed back plate 111 serves as the X-direction moving stage housing section 114 and the Y-direction moving stage housing section 115 (see FIG. 2).

An X-direction moving stage 45 of the drawing unit 40 is housed in the X-direction moving stage housing section 114 when the drawing unit 40 (see FIG. 2) has moved to the front (frontward in the finger insertion direction).

A Y-direction moving stage 47 of the drawing unit 40 is placed in the Y-direction moving stage housing section 115.

The dividing wall 116 is provided inside the lower machine casing 11 in such a manner as to partition the front space in the lower machine casing 11 (the frontward space in the finger insertion direction surrounded by the back plate 111, the bottom plate 112, and the side plates 113a and 113b) into upper and lower spaces.

The dividing wall 116 is provided substantially horizontally. Both of left and right ends of the dividing wall 116 are respectively coupled to the side plates 113a and 113b. A back end of the dividing wall 116 is coupled to the back plate 111.

The lower machine casing 11 is integrally provided with a finger fixing section 30.

The finger fixing section 30 is described with reference to FIG. 3.

Figure 3:
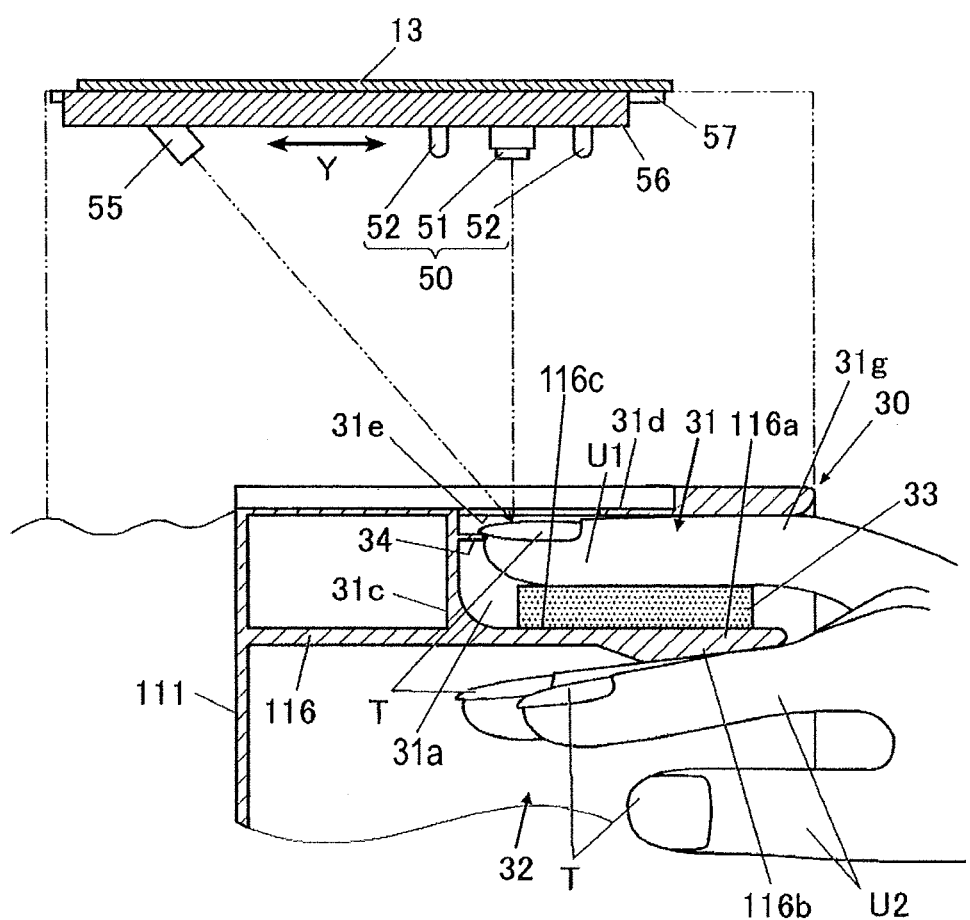
FIG. 3 is a main part cross-sectional view schematically illustrating the configuration of a finger fixing section and its periphery.

FIG. 3 is a main part cross-sectional view schematically illustrating the configuration of the finger fixing section 30 and its peripheral.

The finger fixing section 30 includes a finger receiving section 31 that receives a finger having the nail T being a drawing target on which drawing is performed (hereinafter referred to as the "print finger U1"), and a finger withdrawal section 32 that allows the fingers but the print finger U1, which are not the drawing target, (hereinafter referred to as the "non-print fingers U2") to withdraw.

The finger receiving section 31 is placed in substantially the widthwise center of the lower machine casing 11 above the dividing wall 116. The space partitioned by the dividing wall 116 as the lower side of the lower machine casing 11 forms the finger withdrawal section 32.

For example, if drawing is performed on the nail T of the ring finger, the ring finger as the print finger U1 is inserted into the finger receiving section 31 as illustrated in FIG. 3. The other four fingers (the thumb, index finger, middle finger, and little finger) being the non-print fingers U2 are inserted into the finger withdrawal section 32.

The finger receiving section 31 opens toward the front surface side of the lower machine casing 11 (frontward in the print finger insertion direction). A lower side of the finger receiving section 31 is partitioned by a finger mounting section 116a forming a part of the dividing wall 116, both sides thereof by a divider 31a, and a back side thereof by a divider 31c.

The finger mounting section 116a includes a mounting surface (X-Y plane) 116c on its upper surface. The finger (the print finger U1) having the nail T on which drawing is performed is mounted on the mounting surface 116c.

An upper side of the finger receiving section 31 is partitioned by a ceiling section 31d.

A window 31e through which the nail T of the print finger U1 inserted in the finger receiving section 31 is exposed is formed in the ceiling section 31d.

A finger holding section 33 that holds, from below, the print finger U1 inserted in the finger receiving section 31 is placed on the mounting surface 116c of the finger mounting section 116a.

The finger holding section 33 may be configured to be able to ascend and descend by an unillustrated mechanism. In this case, the finger holding section 33 is configured to descend to a height that does not interfere with putting in and taking out of the print finger U1 when the print finger U1 is inserted into the finger receiving section 31 or removed from the finger receiving section 31, and to ascend in such a manner as to press the print finger U1 up to a position where an upper surface of the print finger U1 contacts an undersurface of the ceiling section 31d when the print finger U1 is fixed.

A nail mount base 34 protruding from the divider 31c is provided in the finger receiving section 31. It is designed such that the end portion of the nail T mounts onto the nail mount base 34 in a state where the print finger U1 is being pressed up by the finger holding section 33. Consequently, the height-wise position of the nail T is fixed at a constant position.

In the present invention, the finger holding section 33 and the nail mount base 34 are not always required in the drawing apparatus of the embodiment. The drawing apparatus 1 may be configured without them.

Front walls 31f (see FIG. 1) that block the front surface side of the lower machine casing 11 are provided in a standing manner on a top surface of the dividing wall 116 at both ends on the front surface side of the lower machine casing 11.

A pair of guide walls 31g that narrows from one ends of the front walls 31f, which are closer to the central portion, toward the finger receiving section 31 and guides the print finger U1 into the finger receiving section 31 is provided in a standing manner on the top surface of the dividing wall 116.

The user can sandwich the dividing wall 116 between the print finger U1 inserted in the finger receiving section 31 and the non-print fingers U2 inserted in the finger withdrawal section 32. Hence, the print finger U1 inserted in the finger receiving section 31 is stably fixed.

In the embodiment, a protrusion 116b protruding downward is formed at a front end of the dividing wall 116.

The protrusion 116b is, for example, a taper portion whose thickness gradually decreases toward the front side and gradually increases toward the back side. The protrusion 116b may have, for example, a shape that is thick as a whole as compared to a recess on a back side of the dividing wall 116.

The protrusion 116b is formed at the front end of the dividing wall 116. Accordingly, when the non-print fingers U2 have been inserted into the finger withdrawal section 32, a space is secured between the already drawn nail T and an undersurface of the dividing wall 116. Consequently, it is possible to prevent the drawing material, such as ink, that have been applied to the nail T, from attaching to the apparatus side and prevent the design drawn on the nail T from being smudged and marred, due to the contact of the already drawn nail T with the undersurface of the dividing wall 116.

An area above the dividing wall 116 alongside the finger receiving section 31 (a position corresponding to the medium insertion/removal port 24 of the case body 2, which is the left side in FIG. 1 in the embodiment) is a home area where the drawing head 41 and the drawing tools 71 are on standby at the time of non-drawing).

The home area is provided with the drawing tool break-in section 61, a drawing tool cap 62, and a head cap mechanism 43.

The drawing tool break-in section 61 is for breaking in the drawing tool 71 described below, and is placed within a drawable area of the drawing tool 71.

A flat-plate like drawn medium inserted from the above-mentioned medium insertion/removal port 24 of the case body 2 is mounted on the drawing tool break-in section 61 being a flat-plate part.

The drawn medium to be mounted on the drawing tool break-in section 61 is simply required to be able to break in a nib 712 and is, for example, a slip of paper.

It is preferable that the drawn medium to be mounted on the drawing tool break-in section 61 be provided substantially as high as the nail T of the print finger U1 inserted in the finger receiving section 31.

In order to prevent the start of drawing from becoming patchy due to reasons such as the dry nib 712 and insufficient deposition of ink, the drawing tool break-in section 61 lowers the drawing tool 71 onto the drawn medium, draws a predetermined figure such as "o" or "∞", breaks in the nib 712, and makes the state of the nib 712 excellent before starting drawing on the nail T with image data.

The predetermined figure to be drawn upon breaking in is not especially limited. However, simple figures such as "o" and "∞" are preferable to prevent a waste of ink.

In breaking in, it is preferable to draw, shifting the position for drawing a figure such as "o" or "∞" bit by bit within an area of the drawing tool break-in section 61 for every break-in.

It is designed such that when drawing has been performed on the substantially entire surface of the drawn medium, a display screen that prompts the replacement of the drawn medium, such as "Please change paper," is displayed on the display unit 26.

In this case, the user removes the drawn medium from the medium insertion/removal port 24 to change it to new paper. Accordingly, it becomes possible to perform a break-in on the new drawn medium.

If the drawn medium is a roll of paper, when the drawing space is used up, the drawn medium is unreeled from the roll of paper to enable break-in on a new drawing surface.

The drawing tool cap 62 is for housing the drawing tool 71 (especially the nib 712 of the drawing tool 71) when drawing is not performed (at the time of non-drawing) after the drawing tool 71 is attached to the drawing unit 40. The drawing tool cap 62 is made of, for example, rubber.

In the embodiment, the drawing tool cap 62 is installed in the front of the drawing tool break-in section 61 (frontward in the finger insertion direction).

The drawing tool caps 62 are provided in such a manner as to be equal in number (four in the embodiment) to the drawing tools 71 that can be attached to the drawing unit 40.

At the time of non-drawing, the drawing tool 71 is moved directly above the drawing tool cap 62, and then lowered by a solenoid 742 described below to house the nib 712 in the drawing tool cap 62. Consequently, the nib 712 can be prevented from becoming dry at the time of non-drawing.

The shape and the like of the drawing tool cap 62 are not limited to the unillustrated example. It may be, for example, an extra-long groove-shaped drawing tool cap that can receive the nibs 712 of all the drawing tools 71 attached to the drawing unit 40.

In the embodiment, the drawing tool cap 62 is provided near the drawing tool break-in section 61 in this manner. Accordingly, upon starting drawing, the drawing tool 71 is raised for a break-in on the nearby drawing tool break-in section 61. Drawing can be then started.

Hence, it is possible to keep the time taken to, for example, move the drawing tool 71 to a minimum, and to perform a speedy drawing operation.

The head cap mechanism 43 is for covering an ink ejection surface of the drawing head 41 at the time of non-drawing.

The head cap mechanism 43 is placed at a position above the dividing wall 116, the position corresponding to a position where the drawing head 41 is placed when the drawing tools 71 are housed in the drawing tool caps 62.

The head cap mechanism 43 is provided to cover the ejection surface of the drawing head 41 at the time of non-drawing. Accordingly, the drawing head 41 can be prevented from becoming dry at the time of non-drawing.

The drawing unit 40 uses a plurality of kinds of drawing materials such as inks to draw on the nail T based on the image data of a selected design image.

In the embodiment, the drawing unit 40 includes a carriage 42 in which the drawing head 41, and a drawing tool unit 72 with the drawing tools 71 are mounted.

The carriage 42 is attached to a carriage support member 44. Consequently, the drawing head 41 and the drawing tool unit 72 are supported by the carriage support member 44 via the carriage 42.

The drawing unit 40 is configured including, for example, the X-direction moving stage 45 for moving the carriage 42 in the X direction (the X direction in FIG. 1, the left-and-right direction of the drawing apparatus 1), an X-direction movement motor 46, the Y-direction moving stage 47 for moving the carriage 42 in the Y direction (the Y direction in FIG. 2, the front-and-back direction of the drawing apparatus 1), and a Y-direction movement motor 48, in addition to the carriage 42 and the carriage support member 44 that supports the carriage 42.

The drawing head 41 is an inkjet drawing tool that sprays a drawing material such as ink, which is a liquid material, to the nail T's surface being a drawing target surface, applies the ink to the nail T's surface, and draws.

The configuration and system in which the drawing head 41 sprays ink are not especially limited.

The drawing head 41 of the embodiment is, for example, an integral-type cartridge where an ink tank is integrated. A plurality of ink chambers (ink storage portions, not illustrated) partitioned separately is provided in the drawing head 41. The ink chambers are respectively filled with, for example, inks of three colors, C, M, and Y, as the liquid materials. The kind and number of inks (liquid materials, drawing materials) are not limited to those illustrated herein.

The ejection surface (not illustrated) in which a nozzle to eject each color ink filled in the ink chamber is provided to a lower surface (a surface facing the finger mounting section 116a when the drawing head 41 is attached to the carriage 42) of the drawing head 41.

The drawing head 41 includes an ink ejection unit 411 for ejecting ink from the nozzle of the ejection surface. The ink ejection unit 411 includes, for example, a piezoelectric element (not illustrated) as an actuator.

The carriage 42 is provided with a head drive circuit board (not illustrated) that drives the drawing head 41.

When the drawing head 41 is attached to the carriage 42, a connector (not illustrated) on the drawing head 41 side is connected to the head drive circuit board. The ink ejection unit 411 is electrically connected to a control apparatus 80 via the head drive circuit board.

Consequently, a driving voltage is applied to the piezoelectric element forming the ink ejection unit 411 in accordance with the control of a drawing control unit 815 described below. The piezoelectric element changes shape or vibrates with the application of the voltage. Accordingly, an unillustrated ink channel is compressed to eject the ink from the nozzle of the ejection surface.

The drawing tool unit 72 includes at least one drawing tool 71 that draws on the nail T in contact with the surface of the nail T of the print finger U1.

The drawing tool 71 is held by a drawing tool holding portion 73.

In the embodiment, the drawing tool unit 72 includes four drawing tool holding portions 73 (described below) that hold the drawing tools 71 one by one. The number, shape, and the like of the drawing tool holding portions 73 are not limited to the illustrated example.

The drawing tool 71 can be replaced as appropriate by opening the above-mentioned drawing tool replacement purpose cover unit 23.

The drawing tools 71 may be attached to all the drawing tool holding portions 73, or may be attached to part of the four drawing tool holding portions 73.

The drawing tool 71 being a drawing tool is for drawing in contact with the surface of the nail T while applying a drawing material such as ink, which is a liquid material, to the surface of the nail T.

The drawing tool (writing instrument) 71 held by the drawing tool holding portion 73 includes a penholder 711 and the nib 712 provided on a distal end side of the penholder 711.

The inside of the penholder 711 is an ink storage portion that stores various inks.

The viscosity, the particle diameter (particle size) of a color material, and the like of the ink stored in the penholder 711 are not especially limited. For example, gold and silver lame inks, white ink, UV curing inks and gel polishes, undercoats, top coats, and nail polishes can also be used as the inks.

The drawing tool 71 is, for example, a pen having the ballpoint pen nib 712 through which the ink stored in the penholder 711 seeps by pressing the nib 712 against the surface of the nail T to enable drawing.

The drawing tool 71 is not limited to the ballpoint pen. The drawing tool 71 may be, for example, a marker pen that impregnates a felt tip with ink to draw, or a brush pen that impregnates a bundle of bristles with ink to draw. Various sizes can be prepared for the nib 712.

If a plurality of the drawing tools 71 is held by the drawing tool holding portions 73, each drawing tool 71 may be one having the nib 712 of the same type, or one having the nib 712 of a different type.

In the embodiment, four drawing tool holding portions 73 holding the drawing tools 71 are arranged in the width direction (the left-and-right direction, the X direction in FIG. 1) of the apparatus. Hence, the nibs 712 of the drawing tools 71 held respectively by the drawing tool holding portions 73 are respectively shifted in position in the X direction (the left-and-right direction of the apparatus). However, the shift amount is set to an integral multiple of one step in the drawing operation. The position is corrected by the number of steps equal to the shift amount according to the drawing tool 71 used for drawing. Drawing is then performed. Therefore, it is configured such that the four drawing tools 71 can draw at the same position.

Each drawing tool holding portion 73 is provided with a drawing tool holder 731 being a cylindrical portion that holds the drawing tool 71 substantially vertically.

The drawing tool holder 731 is configured to move the drawing tool 71 up and down in cooperation with a spring 741 and the solenoid 742 while holding the drawing tool 71 substantially vertically.

Specifically, while the solenoid 742 is being driven, the drawing tool 71 descends resisting the biasing force of the spring 741 to enter a drawing state where the drawing tool 71 can contact the surface of the nail T or drawn medium that is a drawing target.

While the solenoid 742 is open, the drawing tool 71 ascends due to the biasing force of the spring 741 to enter a non-drawing state where the drawing tool 71 is not in contact with the surface of the nail T or drawing medium.

In the embodiment, the solenoid 742 is used as the actuator for raising and lowering the drawing tool 71. However, the actuator for raising and lowering the drawing tool 71 is not limited to the solenoid 742. The drawing tool 71 is light-weight. Accordingly, the actuator for raising and lowering the drawing tool 71 can be configured of various small driving apparatuses such as a small motor, in addition to the solenoid.

The carriage support member 44 that supports the carriage 42 is fixed to an X-direction moving unit 451 attached to the X-direction moving stage 45.

The X-direction moving unit 451 is configured to move in the X direction along an unillustrated guide on the X-direction moving stage 45 with the drive of the X-direction movement motor 46. Consequently, the carriage 42 moves in the X direction (the X direction in FIG. 1, the left-and-right direction of the drawing apparatus 1).

The X-direction moving stage 45 is fixed to a Y-direction moving unit 471 of the Y-direction moving stage 47. The Y-direction moving unit 471 is configured to move in the Y direction along an unillustrated guide on the Y-direction moving stage 47 with the drive of the Y-direction movement motor 48. Consequently, the carriage 42 moves in the Y direction (the Y direction in FIG. 2, the front-and-back direction of the drawing apparatus 1).

In the embodiment, the X-direction moving stage 45 and the Y-direction moving stage 47 are configured to combine the X-direction movement motor 46, the Y-direction movement motor 48, and unillustrated ball screws and guides.

For example, step motors that move a predetermined amount whenever one pulse is transmitted are applied as the X-direction movement motor 46 and the Y-direction movement motor 48 of the embodiment.

In the embodiment, the X-direction movement motor 46, the Y-direction movement motor 48, and the like form a carriage moving unit 49 (see FIG. 5) that moves, in the X and Y directions, the carriage 42 including the drawing tools 71 for drawing on the nail T.

The ink ejection unit 411 of the drawing head 41, the solenoid 742 for moving the drawing tool 71 up and down, the X-direction movement motor 46, and the Y-direction movement motor 48 in the drawing unit 40 are connected to the drawing control unit 815 (see FIG. 5) of the control apparatus 80 described below, and configured to be controlled by the drawing control unit 815.

As illustrated in FIGS. 1 and 2, a base plate 13 is installed in the upper machine casing 12.

A guide rail 57 is provided to the backside (that is, the lower side in FIGS. 1 and 2) of the base plate 13, extending in the front-and-back direction (the Y direction in FIG. 2) of the apparatus.

A moving stage 56 is attached to the guide rail 57.

The moving stage 56 is configured to be movable by a stage movement purpose motor 58 (see FIG. 5) along the guide rail 57 in the front-and-back direction (the Y direction in FIG. 2) of the apparatus.

A light application unit 55 is installed at substantially the center in the left-and-right direction (that is, the X direction in FIG. 1) on an undersurface of the moving stage 56 in the back (that is, the left side in FIG. 2) of the apparatus in the front-and-back direction (that is, the Y direction in FIG. 2).

In the embodiment, the light application unit 55 includes a light source that emits, for example, laser light as light, and a slit portion for changing the light emitted from the light source to light of a straight shape (line shape) in the left-and-right direction.

The light application unit 55 applies the light from the light source through the slit portion to apply the line-shaped light (hereinafter referred to as the line light) to a target. In the embodiment, the light application unit 55 functions as a target image formation unit that forms a line (target image) La (see FIGS. 6A and 7A) in the width direction of a nail area detected by a nail area detection unit 812a described below.

The light source of the light application unit 55 is not limited to the one that emits laser light. The light source may be one that includes, for example, an LED and emits light generated by light emission of the LED.

The light application unit 55 is placed in an orientation from the back of the apparatus toward the finger receiving section 31 in the front of the apparatus, the orientation being inclined at a predetermined inclination angle with respect to a plane direction of the mounting surface 116c on a virtual perpendicular plane being perpendicular to the plane direction of the mounting surface 116c of the finger mounting section 116a, intersecting the width direction of the nail T, and extending along the insertion direction of the print finger U1 into the finger receiving section 31.

The light application unit 55 is configured to apply the line light of one straight line (line shape) along the width direction of the nail T onto the print finger U1 inserted in the finger receiving section 31, and its nail T from an obliquely upward position (in the embodiment, from obliquely above with respect to the nail end direction), deviating in the finger extending direction from directly above the nail T.

In other words, the line light applied from the light application unit 55 is a straight line along the width direction of the nail T when viewed from the application direction.

In the embodiment, the moving stage 56 is moved in the Y direction as appropriate to adjust the position of the light application unit 55. Accordingly, the position of the light application unit 55 is set such that at least a portion having a maximum length in the width direction of the nail T, or its vicinity, is exposed to the line light applied from the light application unit 55.

Furthermore, the position of the light application unit 55 is preferable to be set to a position, the line light from which is also applied to a skin portion of the print finger U1 touching both ends of the nail T in the width direction. The curvature of the surface changes greatly at the locations where the both ends of the nail T in the width direction touch the skin portion of the print finger U1. Hence, when the position of the light application unit 55 is set to such a position, a line La formed on the nail and finger by being exposed to the line light passes the locations where both ends of the nail T in the width direction touch the skin portion of the print finger U1. Consequently, two feature regions that can be clearly distinguished from the other portions appear in a line image Lb (see FIG. 4) obtained by imaging the line La. The feature regions are described in detail below.

The light application unit 55 as the target image formation unit is not limited to the one that applies the line light. It may be, for example, one that performs scanning in the width direction while applying a beam light emitted from the light source to the nail T. In this case, the light application unit 55 further includes a mechanism that performs scanning in the width direction of the nail (that is, the X direction in FIG. 1) with the beam light emitted from the light source.

The light application unit 55 is connected to a light source control unit 816 (see FIG. 5) of the control apparatus 80 described below to be controlled by the light source control unit 816.

A camera 51 as an imaging apparatus is installed at a position that is substantially the center in the left-and-right direction (that is, the X direction in FIG. 1) on the undersurface of the moving stage 56 and that is directly above the nail T of the print finger U1 inserted in the finger receiving section 31, or its vicinity.

The camera 51 preferably has, for example, approximately two million pixels or more.

The camera 51 is for imaging the nail T of the print finger U1 inserted in the finger receiving section 31 from substantially directly above to obtain a finger image (an image of the print finger U1 including an image of the nail T).

Figure 4:
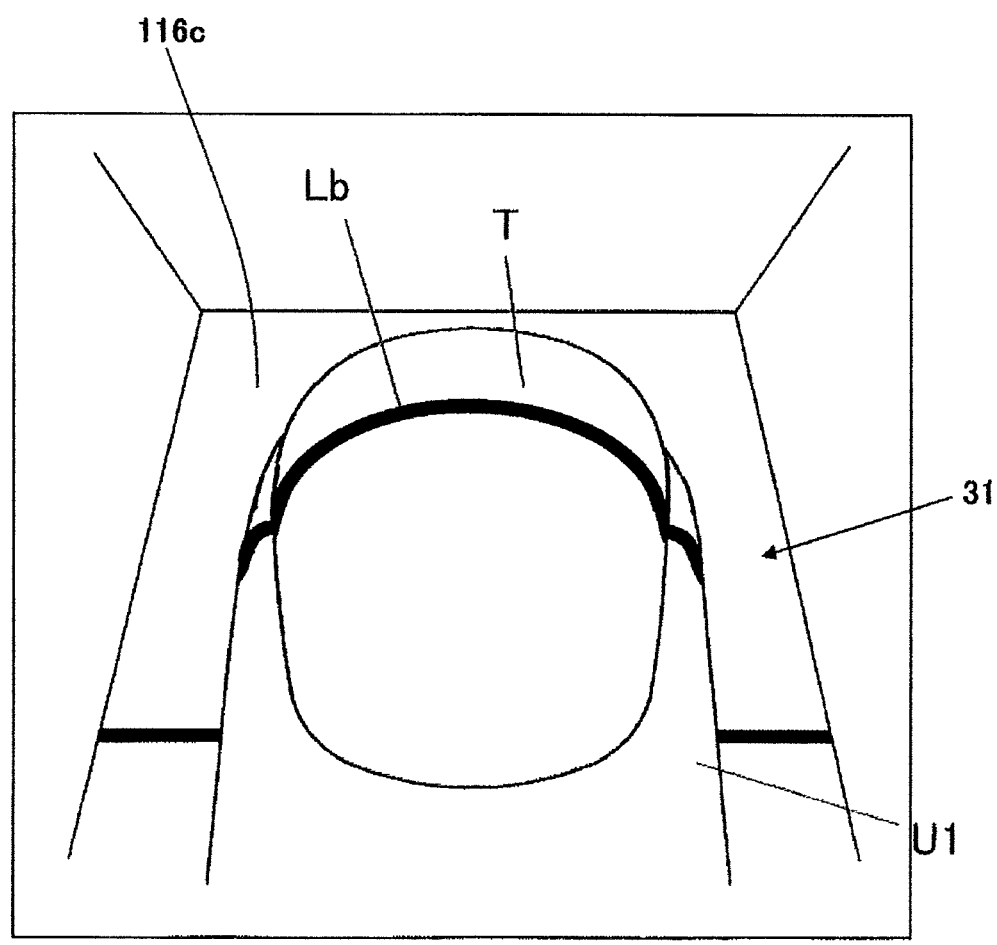
FIG. 4 is a diagram illustrating an example of a finger image obtained by imaging a nail including an inclination detection purpose line drawn on the surface of the nail by a camera.

In the embodiment, the camera 51 further functions as a line imaging unit that images the line (target image) La (see FIGS. 6A and 7A) formed on the surfaces of the nail T and the finger by the light application unit 55 and acquires a finger image including the line image Lb (see FIG. 4).

As described below, in the embodiment, the inclination detection unit 812b detects the height-wise shape of the nail T in the width direction based on the principle of triangulation from the line image (target picture) Lb in the finger image acquired by the camera 51.

Hence, in the embodiment, the light application unit 55 is placed in the back of the apparatus. The line light is applied by the light application unit 55 to the print finger U1 having the nail T not from directly above or directly beside the nail T but from the position deviating in the finger extending direction at the predetermined inclination angle (for example, approximately 45 degrees in FIG. 3) with respect to the plane direction of the mounting surface 116c. The camera 51 then images the line La formed by the light application unit 55 from substantially directly above the nail T of the print finger U1.

FIG. 4 is an example of the finger image obtained by imaging the line La formed on the surfaces of the print finger U1 inserted in the finger receiving section 31, and its nail T.

The line (target image) La formed by the line light applied at the predetermined inclination angle is imaged from substantially directly above the nail T. Accordingly, the finger image including the line image (target picture) Lb having an arc shape illustrated in FIG. 4 is imaged.

The placement and the like of the light application unit 55 and the camera 51 are not limited to the illustrated examples.

For example, the inclination angle at which the light application unit 55 applies the line light to the print finger U1 having the nail T is not limited to 45 degrees, but is simply required to be approximately between 30 degrees and 70 degrees.

The position and the inclination angle of the camera 51 are not limited to the placement where the nail T of the print finger U1 inserted in the finger receiving section 31 is imaged from substantially directly above as in the illustrated examples, but are simply required to be placement where whole area of the nail T can be imaged.

For example, contrary to the embodiment, the light application unit 55 may be placed substantially directly above the nail T of the print finger U1 inserted in the finger receiving section 31 to apply the line light to the surface of the nail T from a direction substantially perpendicular to the plane direction of the mounting surface 116c. The camera 51 may be configured to image the line La from obliquely above (for example, from obliquely above in the nail end direction), deviating in the finger extending direction from directly above the nail T.

In other words, it is required that the direction in which the line light is applied to the nail T by the light application unit 55 is set to a direction having a first angle with respect to the plane direction of the mounting surface 116c on the virtual perpendicular plane, and that the direction of the optical axis of the camera 51 with respect to the nail T is set to a direction having a second angle, which is different from the first angle, with respect to the plane direction of the mounting surface 116c on the virtual perpendicular plane. At this point in time, the difference between the first and second angles is the above inclination angle.

Illumination lamps (illumination devices) 52 such as white LEDs are installed on the moving stage 56 in such a manner as to surround the camera 51. The illumination lamp 52 is for illuminating the nail T of the print finger U1 when the camera 51 images the nail T.

An imaging unit 50 in the embodiment is configured including the camera 51 and the illumination lamps 52.

The imaging unit 50 is connected to an imaging control unit 811 (see FIG. 5) of the control apparatus 80 described below to be controlled by the imaging control unit 811.

Image data of an image imaged by the imaging unit 50 is stored in a nail image storage area 821 of a storage unit 82 described below.

The control apparatus 80 is installed on, for example, the base plate 13 placed in the upper machine casing 12.

Figure 5:
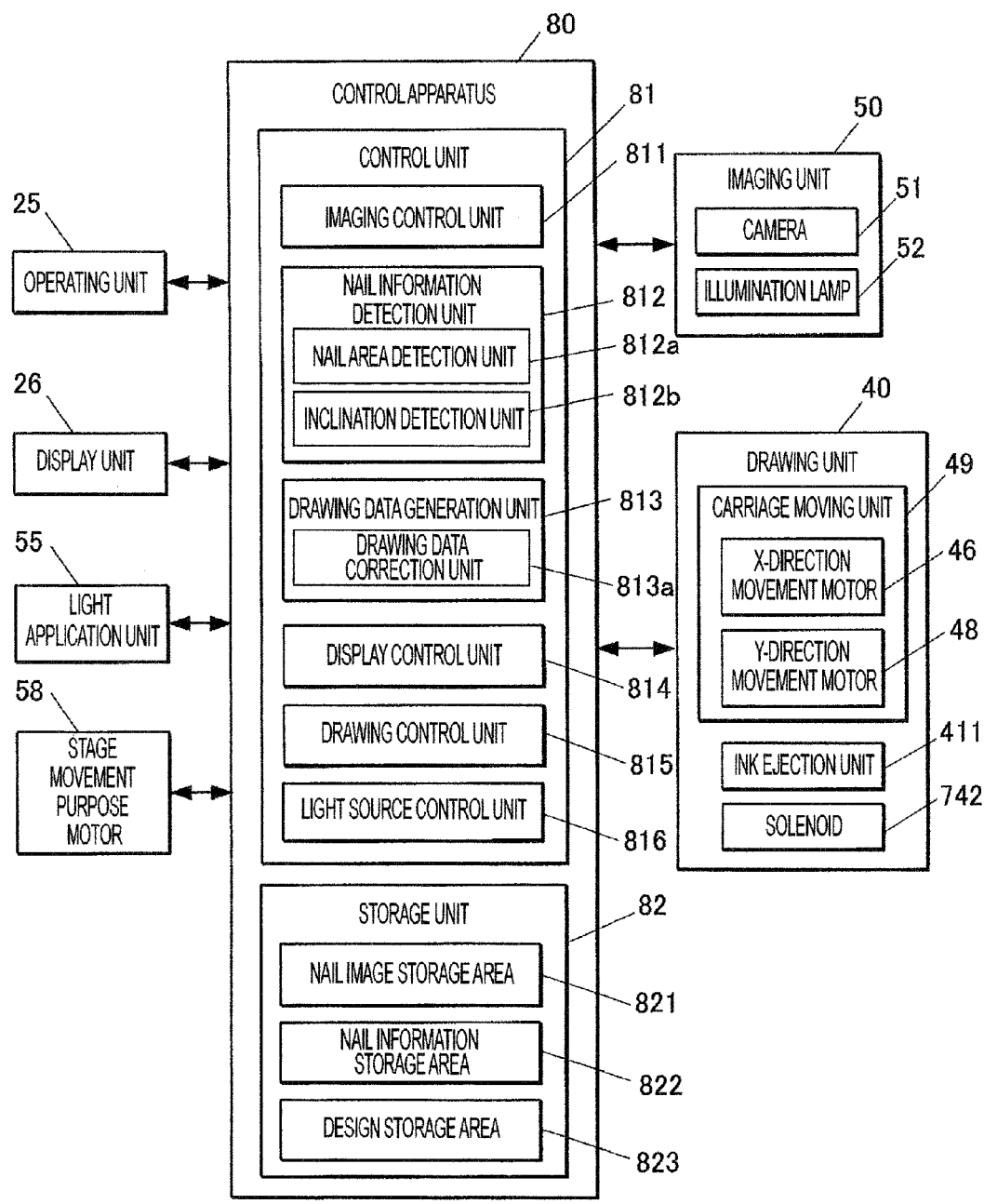
FIG. 5 is a main part block diagram illustrating a control configuration of the drawing apparatus according to the embodiment.

FIG. 5 is a main part block diagram illustrating a control configuration in the embodiment.

As illustrated in FIG. 5, the control apparatus 80 is a computer including a control unit 81 configured of a CPU (Central Processing Unit) and the storage unit 82 configured of ROM (Read Only Memory), RAM (Random Access Memory), and the like (none are illustrated).

Various programs, various types of data, and the like for operating the drawing apparatus 1 are stored in the storage unit 82.

Specifically, various programs such as a nail information detection program for detecting nail information on the shape and the position of the nail T, the degree of the inclination of the nail T, and the like from a finger image, a drawing data generation program for generating drawing data, and a drawing program for performing a drawing process are stored in the ROM of the storage unit 82. Each unit of the drawing apparatus 1 is configured to be centrally controlled by the control apparatus 80 executing these programs.

In the embodiment, the storage unit 82 is provided with the nail image storage area 821 that stores an image of the nail T of the print finger U1 of the user (a finger image including the image of the nail T) acquired by the imaging unit 50, a nail information storage area 822 that stores the nail information detected by a nail information detection unit 812, a design storage area 823 that stores image data of design images to be drawn on the nail T, and the like.

The control unit 81 includes the imaging control unit 811, the nail information detection unit 812, a drawing data generation unit 813, a display control unit 814, the drawing control unit 815, and the light source control unit 816 from the viewpoint of functions.

The functions as the imaging control unit 811, the nail information detection unit 812, the drawing data generation unit 813, the display control unit 814, the drawing control unit 815, and the like are achieved by the cooperation between the CPU of the control unit 81 and the programs stored in the ROM of the storage unit 82.

The imaging control unit 811 is for controlling the camera 51 and the illumination lamps 52 of the imaging unit 50 to image an image of the nail T of the print finger U1 inserted in the finger receiving section 31 with the camera 51.

In the embodiment, the imaging control unit 811 controls the camera 51 and the illumination lamps 52 of the imaging unit 50 to image the nail T of the print finger U1 and acquire an image of the nail T.

The imaging control unit 811 further controls the camera 51 and the illumination lamps 52 of the imaging unit 50 serving as the line imaging unit to image the print finger U1 having the nail T, on the surface of which the inclination detection purpose line La has been drawn by the light application unit 55, and to acquire an image of the print finger U1 including the line image Lb.

The nail information detection unit 812 is for detecting nail information of the nail T of the print finger U1 based on the image of the nail T of the print finger U1 imaged and acquired by the camera 51.

In the embodiment, the nail information detection unit 812 includes the nail area detection unit 812*a* and the inclination detection unit 812*b*.

The nail information here includes information on the shape and size of the nail area formed by the outline of the nail T, and the position (horizontal position) of the nail T, the degree of the inclination of the nail T, and the like.

The nail area detection unit 812*a* detects the outline of the nail T and detects whole area formed by the outline of the nail T as the nail area. The nail area detected by the nail area detection unit 812*a* becomes a drawing area where drawing is performed by the drawing unit 40.

The inclination detection unit 812*b* detects the degree of the inclination of the nail T in the width direction with respect to a proper posture (reference state) that the nail T is not inclined, caused by the print finger U1's rotation (roll) about the lengthwise axis of the print finger U1, the axis intersecting the width direction of the nail T.

As described below, the inclination detection unit 812*b* detects the curved shape of the nail T (the curvature of the nail T in the width direction, hereinafter referred to as the nail curvature) in the process of detecting the degree of the inclination of the nail T. The curved surface correction is performed on a design image based on the nail curvature detected by the inclination detection unit 812*b*. Accordingly, nail printing with beautiful finish without distortion becomes possible in the drawing apparatus 1.

A specific description is given here of the detection of the nail information by the nail information detection unit 812.

The nail area detection unit 812*a* detects the shape, size, and position of the outline of the nail T from the finger image including the nail image of the nail T of the print finger U1, the finger image having been acquired by the camera 51, based on, for example, a difference in color between the nail T and the finger part other than the nail T. The outline is acquired as information on the outline of the nail T represented by x and y coordinates or the like.

The nail area detection unit 812*a*'s method for detecting the outline (shape and the like) of the nail T is not especially limited, and not limited to the one described herein.

If the print finger U1 is rotated about the lengthwise axis of the print finger U1, the inclination detection unit 812*b* detects the degree of the inclination of the nail T caused by the rotation based on the finger image (the image of the print finger U1 including the image of the nail T) including the inclination detection purpose line La image (that is, the line image Lb) imaged by the camera 51.

In the embodiment, firstly, the inclination detection unit 812*b* detects the line image Lb from the finger image based on, for example, differences in color and light reflection condition between the nail T and the finger part.

The degree of the inclination of the nail T is then detected based on the line image Lb.

In other words, the positions and inclination angles of the camera 51 and the light application unit 55 are preset on the apparatus side. The set values are known.

Figure 6A:
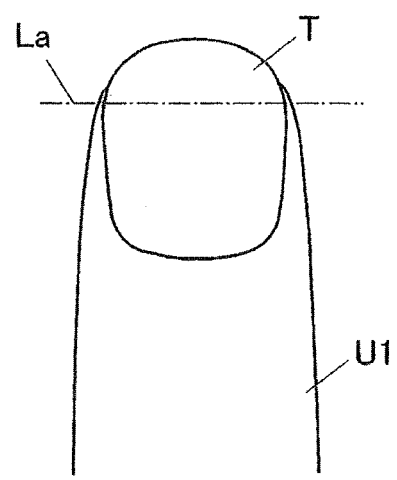
FIG. 6A is a diagram illustrating a state where the inclination detection purpose line is formed on the hardly inclined finger when viewed from a line light application direction.
Figure 7A:
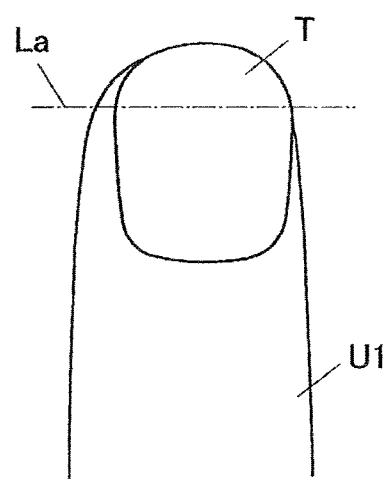
FIG. 7A is a diagram illustrating a state where the inclination detection purpose line is formed on the inclined finger when viewed from the line light application direction.

When the line light is applied from obliquely above, deviating in the finger extending direction from directly above the nail T, the line La formed by the line light on the surfaces of the nail T and the print finger U1 is a straight line when viewed from the line light application direction as illustrated in FIGS. 6A and 7A.

When the line La formed by the line light on the surfaces of the nail T and the print finger U1 is imaged from substantially directly above the nail T, the line La is curved following the shapes of the surfaces of the nail T and the print finger U1. The finger image (the image of the print finger U1 including the image of the nail T) including the arc-shaped line image Lb illustrated in FIG. 4 is imaged.

Figure 6B:
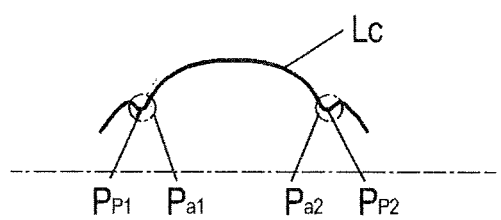
FIG. 6B is a diagram illustrating an example of the shape, in a height direction, of the finger having the nail illustrated in FIG. 6A.
Figure 7B:
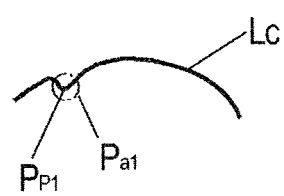
FIG. 7B is a diagram illustrating an example of the height-wise shape of the finger having the nail illustrated in FIG. 7A.

The inclination detection unit 812b calculates a finger shape curve Lc indicating changes, along the width direction of the nail T, in actual heights of the surfaces of the nail T and the print finger U1 on which the line La is formed (that is, changes, along the width direction of the nail T, in height-wise distance of the nail T between a given reference position and the surface of the nail T, at a location where the line La on the nail T and the print finger U1 is formed) as illustrated in FIGS. 6B and 7B, with the principle of triangulation based on the shape of the line image Lb and the value of the above inclination angle.

If the line image Lb has some width (that is, if the line La is relatively bold), the inclination detection unit 812b extracts a widthwise central position of the line image Lb (for example, a portion having the highest brightness) to detect the degree of the inclination of the nail T using the central position.

The line light is assumed here to be formed into a shape of one straight line. However, the shape of the line light is not limited to this.

For example, the line light may have a shape having a side of a straight line shape along the width direction of the nail T and having the other part of an arbitrary shape such as a curve. In this case, the part being the straight line shaped side is used to enable detection of the degree of the inclination of the nail T.

Furthermore, the line light may not be of the shape having the straight line shaped side, but may be one including a part formed in a preset shape such as a curve or broken line. Also in this case, the part formed in the preset shape is used to enable detection of the curved shape of the nail T.

FIGS. 6B and 7B illustrate the finger shape curve Lc obtained by plotting widthwise changes in heights of the surfaces of the nail T and the print finger U1, the changes being calculated by the inclination detection unit 812b with the principle of triangulation based on the shape of the line image Lb and the value of the above inclination angle.

In other words, the finger shape curve Lc indicates widthwise changes in heights of the surfaces of the nail T and the print finger U1.

A case is illustrated here in which the skin portion of the print finger U1 touching the ends of the nail T in the width direction are also exposed to the line light. The inclination detection unit 812b sets, as a reference state, a state where the shape on one side (right side) of the finger shape curve Lc across the center in the width direction of the nail T and its shape on the other side (left side) across the center are shapes having symmetry within a predetermined allowable range. If the finger shape curve Lc is in the reference state, the inclination detection unit 812b determines that the print finger U1 is mounted appropriately in the finger receiving section 31 and the degree of the inclination of the nail T is within the allowable range. On the other hand, if the finger shape curve Lc deviates from the reference state, the inclination detection unit 812b determines that the print finger U1 is inclined with respect to the state where it is mounted appropriately in the finger receiving section 31 and the degree of the inclination of the nail T exceeds the allowable range.

FIG. 6B illustrates the finger shape curve Lc of when the print finger U1 is hardly rotated about the lengthwise axis (rotation axis) of the print finger U1 with respect to the reference state to be hardly inclined, and the print finger U1 is mounted appropriately in the finger receiving section 31, as illustrated in FIG. 6A.

On the other hand, FIG. 7B illustrates the finger shape curve Lc of when the print finger U1 is rotated relatively largely about the lengthwise axis (rotation axis) of the print finger U1 with respect to the reference state to be inclined relatively largely in the finger receiving section 31, as illustrated in FIG. 7A.

In FIGS. 6B and 7B, regions Pa1 and Pa2 surrounded by dot-and-dash lines on the finger shape curve Lc correspond to the locations where the ends of the nail T in the width direction touch the skin portion of the print finger U1, and their vicinities. The shapes in the regions are reduced in height with respect to both sides in the width direction corresponding to the positions of the regions. The curvature of the finger shape curve Lc changes greatly with respect to both sides. The direction of the curve is also opposite to both sides.

In the embodiment, the regions Pa1 and Pa2 on the finger shape curve Lc are set as feature regions. Points where the curvature of the finger shape curve Lc changes greatly in the feature regions Pa1 and Pa2 are set as feature points Pp1 and Pp2.

FIG. 7B illustrates a case where the inclination of the print finger U1 is large and accordingly the left feature region Pa1 is visible and the right feature region Pa2 is not visible.

As illustrated in FIG. 6B, if the two feature points Pp1 and Pp2 exist on the finger shape curve Lc, the shape of a region between the two feature points Pp1 and Pp2 on the finger shape curve Lc indicates widthwise changes in height of the surface of the nail T. The shapes of regions outward of the two feature points Pp1 and Pp2 on the finger shape curve Lc indicate widthwise changes in height of the surface of the finger's other part than the nail T.

In the embodiment, how the height of the nail T changes between the two feature points Pp1 and Pp2, which is detected by the inclination detection unit 812b, is detected assuming to indicate the curved shape (the nail curvature) of the nail T.

The inclination detection unit 812b of the embodiment calculates the finger shape curve Lc illustrated in FIGS. 6B and 7B that illustrate changes along the width direction in height of the surface of the nail T and then calculates an evaluation value indicating the degree of the inclination of the nail T caused by rotation about the lengthwise axis (rotation axis) of the finger.

Methods for evaluating the degree of the inclination of the nail T is described below.

<First Method>

Figure 8:
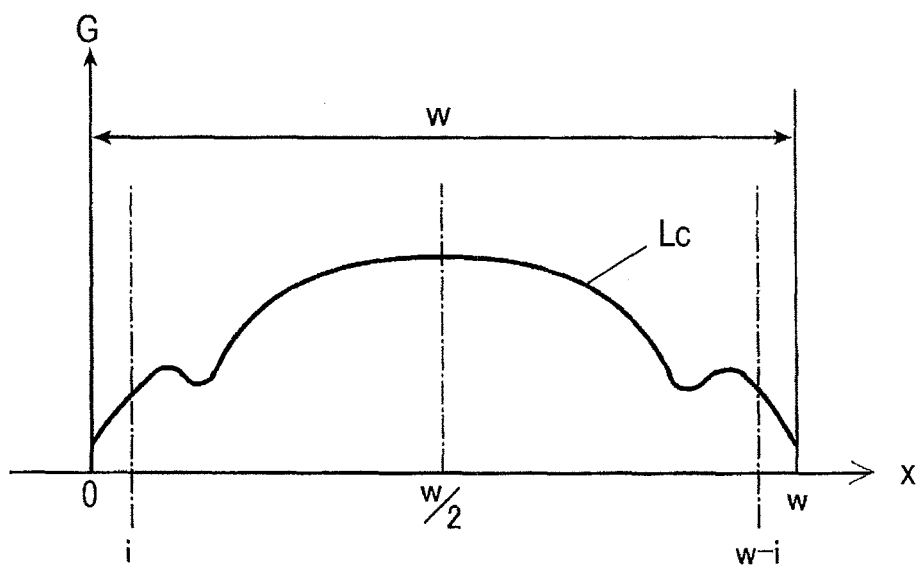
FIG. 8 is an explanatory diagram illustrating, on a graph, the height-wise shape of the finger having the uninclined nail.
Figure 10:
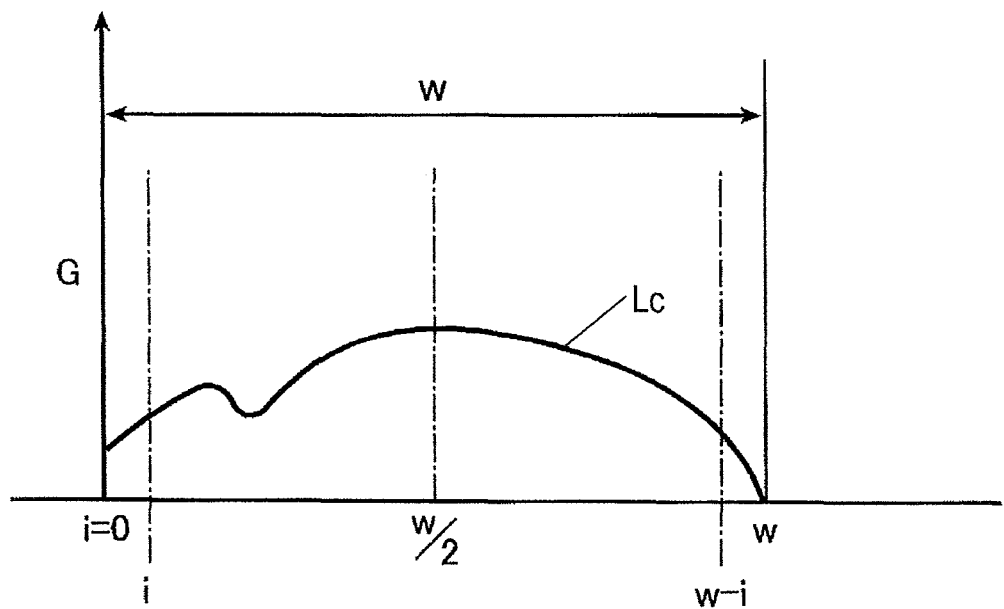
FIG. 10 is an explanatory diagram illustrating, on a graph, the height-wise shape of the finger having the inclined nail.

As a first method, firstly, the calculated finger shape curve Lc indicating changes along the width direction in height of the nail T is assumed to be a graph Gx where the vertical axis (height) direction is G and the horizontal axis (width) direction is x, as illustrated in FIGS. 8 and 10. The left end of the finger shape curve Lc is aligned with a position of an origin (x=0) of the horizontal axis.

When a maximum value of the finger shape curve Lc in the horizontal axis direction is W, the width of the finger shape curve Lc in the horizontal axis direction is W. A center point (W/2) of the width (W) in the horizontal axis direction on the finger shape curve Lc is obtained.

One of the right and left sides of the finger shape curve Lc across the center point (W/2) is reversed horizontally to overlay the other. Consequently, the symmetry of the right and left sides of the finger shape curve Lc across the widthwise center point are determined.

For example, the graph illustrated in FIG. 8 corresponds to FIG. 6B of when the finger is hardly rotated about the lengthwise axis (rotation axis) of the finger with respect to the reference state and accordingly the nail T is hardly inclined.

Figure 9A:
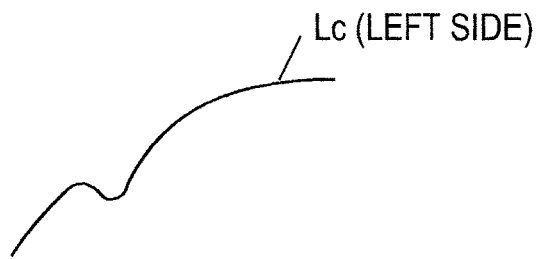
FIG. 9A is a diagram illustrating the shape of the left half of FIG. 8.

In this case, the shape of the left side of the finger shape curve Lc across the center point (W/2) is a shape indicated by a solid line in FIG. 9A.

The right side of the finger shape curve Lc across the center point (W/2) is set as one side. The one side is reversed horizontally. Its shape is a shape indicated by a dot-and-dash line in FIG. 9B.

Figure 9B:
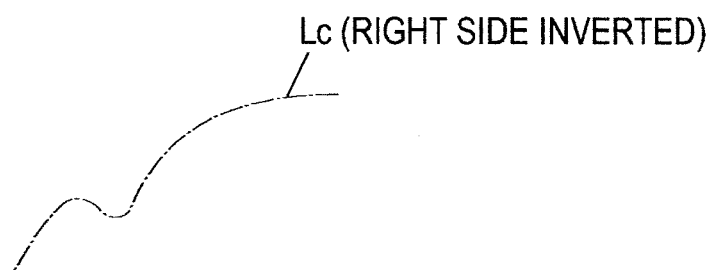
FIG. 9B is a diagram illustrating the shape of the right half of FIG. 8.
Figure 9C:
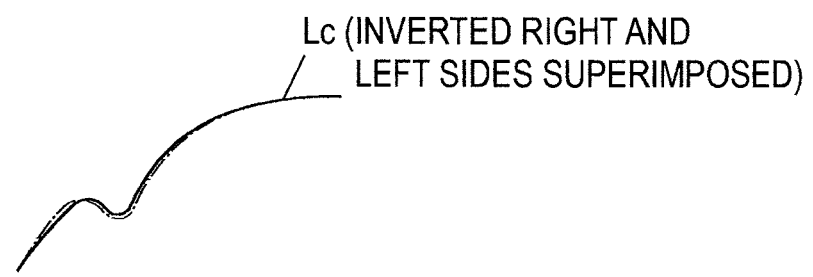
FIG. 9C is a diagram illustrating a state where the shape illustrated in FIG. 9A and the shape illustrated in FIG. 9B are superimposed.

FIG. 9C illustrates the solid line in FIG. 9A and the dot-and-dash line in FIG. 9B, which are superimposed.

As illustrated in FIG. 9C, if the finger is hardly rotated and the nail is hardly inclined, one of the right and left shapes of the finger shape curve Lc across the center point (W/2) is reversed horizontally, and overlays the other. They are substantially superposed. In other words, in this case, it can be seen that the finger shape curve Lc has a shape having substantially left-right symmetry.

In terms of such a left-right symmetry, the degree of the left-right symmetry of the finger shape curve Lc can be evaluated by an evaluation value (first specific value) calculated by an evaluation equation where the value is zero at the time of having left-right symmetry, such as illustrated in the following equation 1.

[Mathematical Formula 1]

$$\sum_{i=0}^{w/2} |Gi - Gw - i| \quad \text{(Formula 1)}$$

It is considered to be difficult in practice to obtain the widthwise midpoint of the nail T. Hence, the evaluation value may also be calculated for cases where the center point is (W/2)−1 and (W/2)+1 to set a minimum value among them as the evaluation value.

Many of human fingers (fingers having the nail T) are substantially left-right symmetric in terms of the height-wise shape. Hence, the evaluation value is small in the reference state where the finger is hardly rotated about the lengthwise rotation axis of the finger.

In contrast, if the finger is rotated about the lengthwise rotation axis of the finger with respect to the reference state, and the nail T is inclined, the larger the inclination, the larger the evaluation value.

For example, the graph illustrated in FIG. 10 corresponds to FIG. 7B of when the finger is rotated relatively largely about the lengthwise rotation axis of the finger.

Figure 11A:
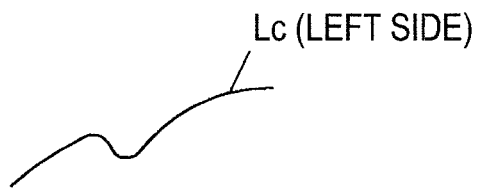
FIG. 11A is a diagram illustrating the shape of the left half of FIG. 10.

In this case, the shape of the left side of the finger shape curve Lc across the center point (W/2) is a shape indicated by a solid line in FIG. 11A.

The right side of the finger shape curve Lc across the center point (W/2) is set as the other side. When the other side is reversed horizontally, its shape is a shape indicated by a dot-and-dash line in FIG. 11B.

Figure 11B:
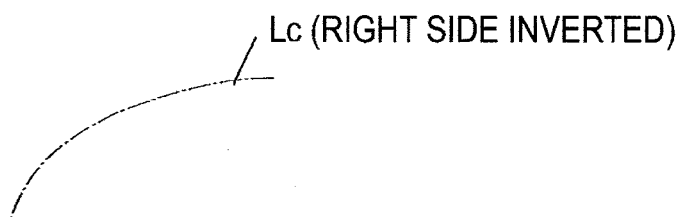
FIG. 11B is a diagram illustrating the shape of the right half of FIG. 10.
Figure 11C:
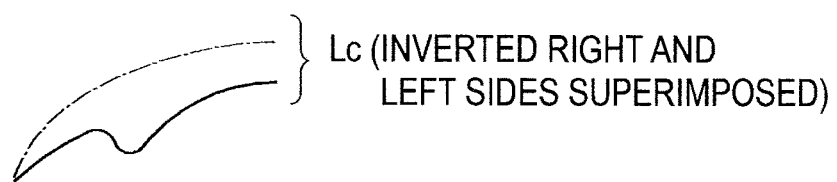
FIG. 11C is a diagram illustrating a state where the shape illustrated in FIG. 11A and the shape illustrated in FIG. 11B are superimposed.

FIG. 11C illustrates the solid line in FIG. 11A and the dot-and-dash line in FIG. 11B, which are superimposed.

As illustrated in FIG. 11C, if the finger is rotated relatively largely with respect to the reference state, when the right and left sides of the finger shape curve Lc across the center point (W/2) are superimposed, it can be seen that they are displaced largely from each other and are not left-right symmetric.

In such a case, the evaluation value calculated by the above evaluation equation is increased.

In the embodiment, it is configured to notify the user, if it is the case, that the calculated evaluation value is larger than a predetermined threshold value (first threshold value).

A specific notification method is not especially limited. However, for example, an alert such as "The nail is inclined. Place the finger straight again." is displayed on the display unit 26 to prompt the user to insert the print finger U1 (the nail T) again or adjust the position of the inserted finger in the rotation direction.

When the evaluation value is equal to or less than the threshold value (the first threshold value), a drawing data correction unit 813a corrects the drawing data in accordance with the degree of the inclination of the nail T, as appropriate. The drawing operation is then performed.

In the first method, the feature regions Pa1 and Pa2 may not exist on the finger shape curve Lc. Hence, when the first method is applied, the position where the nail T is exposed to the line light may be a position where the finger skin portion touching the ends of the nail T in the width direction are not exposed to the line light.

<Second Method>

As a second method, firstly, the two feature regions Pa1 and Pa2 including the feature points Pp1 and Pp2 where the curvature changes greatly at the boundaries between the nail T part and the finger part are extracted as illustrated in FIGS. 6B and 7B.

The difference in height between the two feature points Pp1 and Pp2 respectively in the two feature regions Pa1 and Pa2 is calculated to set the calculation result as an evaluation value (a second specific value).

For example, when the finger is hardly rotated with respect to the reference state, and the nail T is not inclined, the heights of the two feature points Pp1 and Pp2 are substantially the same, as illustrated in FIG. 6B. Hence, the evaluation value is small.

In contrast, when the finger is rotated relatively largely with respect to the reference state and the nail T is inclined relatively largely, the heights of the two feature points Pp1 and Pp2 are very different from each other. Hence, the evaluation value is large. Alternatively, as illustrated in FIG. 7B, only the feature point Pp1 is detected to result in a large evaluation value.

When the evaluation value is larger than a predetermined threshold value (a second threshold value), it is notified to the user as in the first method.

On the other hand, when the evaluation value is equal to or less than the threshold value (the second threshold value), the drawing data correction unit 813a corrects the drawing data in accordance with the degree of the inclination of the nail T, as appropriate. The drawing operation is then performed.

In the second method, at least one of the feature regions Pa1 and Pa2 needs to exist on the finger shape curve Lc. Hence, when the second method is applied, a position where the nail T is exposed to the line light needs to be a position where the finger skin portion touching the end of the nail T in the width direction is also exposed to the line light.

In terms of the above two methods for obtaining an evaluation value corresponding to the degree of the inclination of the nail T (that is, the first method in which left-right symmetry of the widthwise shape of the nail T, which can be detected from the finger shape curve Lc, is evaluated, and the second method in which the difference in height position between the two feature points Pp1 and Pp2 on the finger shape curve Lc is evaluated), one of the methods may be applied, or both methods are used in combination.

When both methods are used in combination, a determination may be made depending on, for example, whether or not the value of a total of the evaluation values obtained by the methods exceeds a predetermined threshold value.

The inclination detection unit 812b's method for detecting the degree of the inclination of the nail T, and the method for evaluating the degree of the inclination of the nail T are not limited to those illustrated here.

The threshold values of the evaluation values in the above methods are set as appropriate, from the viewpoint of whether or not the correction of drawing data to be made by the drawing data correction unit 813a will do. In other words, the threshold value of the evaluation value is set to a value that enters a state where drawing data can be corrected by the drawing data correction unit 813a if the evaluation value does not exceed the threshold value, and to a value that enters a state where drawing data cannot be corrected by the drawing data correction unit 813a if the evaluation value exceeds the threshold value.

The level of correctable inclination also depends on the curved shape (the nail curvature) of the nail T. Therefore, it is preferable to set the threshold value of the evaluation value in accordance with the nail curvature of the nail T.

For example, an arc pattern 1 corresponding to a range where the nail curvature is relatively small, an arc pattern 3 corresponding to a range where the nail curvature is relatively large, and an arc pattern 2 corresponding to a range where the nail curvature is between them are preset. A threshold value of the evaluation value corresponding to each arc pattern is stored in advance in the storage unit 82 or the like.

The curved shape of the nail T is classified into any of the three arc patterns according to the value of the nail curvature.

A threshold value of the evaluation value applied to the nail T may be decided depending on the classified arc pattern.

A threshold value of the evaluation value may be stored in advance in the storage unit 82 or the like, associated with a user name, the type of finger, and the like after the threshold value is set once for the nail T. The threshold value may be read from the storage unit 82 to be applied when the nail T of the same finger of the same user is targeted for drawing.

The drawing data generation unit 813 generates data for drawing to be drawn on the nail T of the print finger U1 by the drawing unit 40 based on the nail information detected by the nail information detection unit 812.

Specifically, the drawing data generation unit 813 performs an adjustment process (a fitting process) by reducing or enlarging the image data of a design image based on the nail information on the shape and the like of the nail T detected by the nail information detection unit 812. Accordingly, the drawing data generation unit 813 generates drawing data for drawing the design image on the nail T.

The drawing data generation unit 813 of the embodiment includes the drawing data correction unit 813a that corrects drawing data.

The nail T is inclined due to rotation about the rotation axis in the finger extending direction. However, when it is determined to be within a range where the correction of the drawing data by the drawing data correction unit 813a will do (that is, when the evaluation value is equal to or less than a predetermined threshold value), the drawing data correction unit 813a corrects the drawing data for drawing on the nail T based on the detection result of the inclination detection unit 812b.

Furthermore, in the embodiment, the curvature of the nail T is detected by the inclination detection unit 812b. The drawing data correction unit 813a corrects the drawing data (curved surface correction) in accordance with the nail curvature.

When the curved shape of the nail T is classified into any of a plurality of arc patterns (for example, the arc patterns 1 to 3), and a correction value for the curved surface correction is prepared for each arc pattern, the drawing data correction unit 813a corrects the drawing data (the curved surface correction) in accordance with the correction value corresponding to the classified arc pattern of the nail T.

The display control unit 814 is for controlling the display unit 26 to display various display screens on the display unit 26.

In the embodiment, the display control unit 814 is configured to display, on the display unit 26, for example, a design image selection screen, a thumbnail image for a design check, a finger image obtained by imaging the print finger U1, and a nail image included in the finger image (an image of the nail T), and various instruction screens.

In the embodiment, when it has been determined that the degree of the inclination of the nail T exceeds a predetermined threshold value, the display control unit 814 causes the display unit 26 to display an alert to prompt the resetting of the finger to notify the user of the excess.

The drawing control unit 815 outputs, to the drawing unit 40, the drawing data of the design image generated by the drawing data generation unit 813 after the curved surface correction has been made as appropriate. The drawing control unit 815 controls the operation of the X-direction movement motor 46 and the Y-direction movement motor 48 of the carriage moving unit 49 of the drawing unit 40, the ink ejection unit 411 of the drawing head 41, and the solenoid 742 that raises or lowers the drawing tool 71 to draw on the nail T in accordance with the drawing data.

The light source control unit 816 is for controlling the operation of the light application unit 55.

In the embodiment, the light source control unit 816 is configured to apply the line light from the light application unit 55 to a position of the longest portion (that is, a broad portion) of the nail T in the width direction, or its vicinity, within the nail area detected by the nail area detection unit 812a, further preferably a position where a finger skin portion touching an end of the nail T in the width direction is also exposed to the line light.

The control unit 81 controls the stage movement purpose motor 58 as appropriate to move the moving stage 56 along the guide rail 57 in the Y direction (that is, the front-and-back direction of the drawing apparatus 1). The control unit 81 adjusts the position of the light application unit 55 in such a manner as to apply the line light from the light application unit 55 to a position of the longest portion of the nail T in the width direction, or its vicinity, further preferably a position where a finger skin portion touching an end of the nail T in the width direction is also exposed to the line light.

Specifically, the line light application position is grasped on the apparatus side based on the image of the camera 51. In accordance with this, the position of the light application unit 55 is automatically adjusted.

The adjustment of the position of the light application unit 55 is not limited to the case of automatic adjustment. For example, an image imaged by the camera 51 may be displayed on the display unit 26 as appropriate. The user may adjust the position of the light application unit 55 manually while looking at the display.

Next, the operation of the drawing apparatus 1 and a method for calculating the evaluation value using the drawing apparatus 1 in the embodiment are described.

Figure 12:
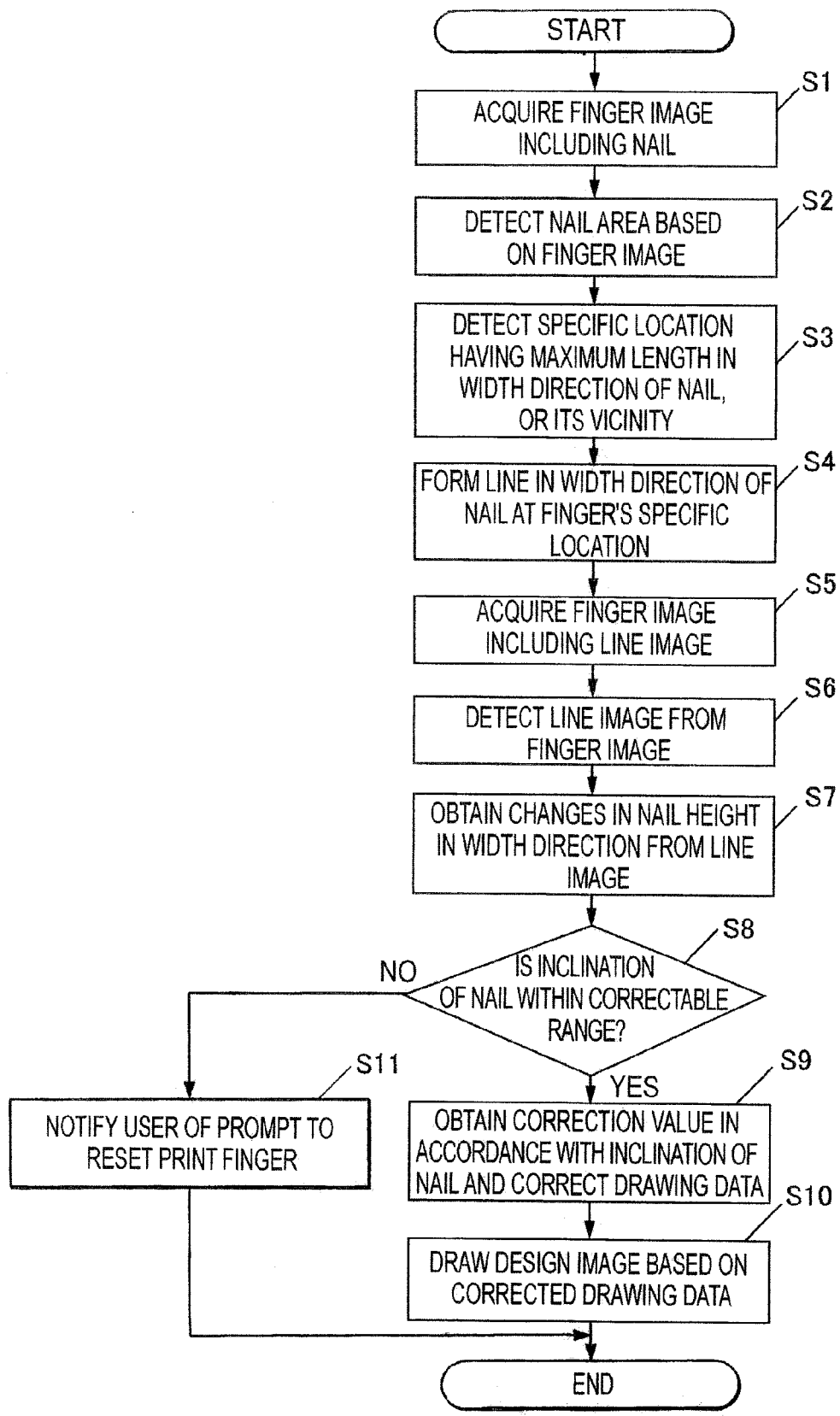
FIG. 12 is a flowchart illustrating a drawing process including an inclination detection process in the embodiment.

FIG. 12 is a flowchart illustrating the flow of the method for calculating the evaluation value of a nail of the embodiment.

As illustrated in FIG. 12, if the drawing apparatus 1 is used to detect the degree of the inclination of the nail T, the user turns on a power switch first to start the control apparatus 80.

Next, the user inserts the print finger U1 into the finger receiving section 31, inserts the non-print fingers U2 into the finger withdrawal section 32, and fixes the print finger U1. The user then operates a switch to start a detection operation.

When an instruction is input from the switch, the imaging control unit 811 controls the imaging unit 50 to cause the camera 51 to image the print finger U1 while illuminating the print finger U1 with the illumination lamps 52.

Consequently, the imaging control unit 811 acquires a finger image of the print finger U1 inserted in the finger receiving section 31 (Step S1).

Next, the nail area detection unit 812a detects (calculates) the outline (nail area) of the nail T based on the finger image (Step S2).

The light source control unit 816 obtains a specific location where the length of the nail T in the width direction (x direction) is maximum, or its vicinity, further preferably where the skin portion of the print finger U1 touching an end of the nail T in the width direction is also exposed to the line light, within the detected nail area of the print finger U1 (Step S3).

The line light is applied to the specific location of the print finger U1 by the light application unit 55 to draw the inclination detection purpose line La (see FIGS. 6A and 7A) in the width direction of the nail T (Step S4).

When the line La has been formed on the nail T, the imaging control unit 811 controls the imaging unit 50 again to cause the camera 51 to image the print finger U1 while illuminating the print finger U1 with the illumination lamps 52. Consequently, the imaging control unit 811 acquires a finger image including the line image Lb corresponding to the line La drawn on the nail T (Step S5).

When the finger image has been acquired, the inclination detection unit 812b detects the line image Lb from the finger image based on the difference in color from the nail T, and the like (Step S6).

The inclination detection unit 812b then calculates the finger shape curve Lc indicating changes, along the width direction, in heights of the surfaces of the nail T and the print finger U1 based on the line image Lb (Step S7).

The degree of the inclination of the nail T is then evaluated based on the calculated finger shape curve Lc to determine whether or not the degree of the inclination is within a range where the drawing data correction unit 813a can correct the drawing data (Step S8).

Specifically, for example, an evaluation value for evaluating the left-right symmetry of a curve representing the height-wise position of the nail T is calculated. Alternatively, height-wise positions of a plurality of feature points appearing on a curve representing the height-wise position of the nail T are compared to calculate an evaluation value. It is then determined whether or not the evaluation value exceeds a predetermined threshold value corresponding to the drawing data correctable range.

If it has been determined that the degree of the inclination of the nail T is within the correctable range (that is, if the evaluation value is equal to or less than the threshold value, Step S8; YES), the drawing data correction unit 813a obtains a correction value in accordance with the degree of the inclination of the nail T to correct the drawing data (Step S9). The drawing data correction unit 813a draws the design image with the corrected drawing data (Step S10).

In contrast, if it has not been determined that the degree of the inclination of the nail T is within the correctable range (that is, if the evaluation value exceeds the threshold value, Step S8; NO), it is notified the user by, for example, causing the display unit 26 to display a prompt to reset the print finger U1 (Step S11). The drawing operation is finished.

As described above, according to the embodiment, the line light is applied to the nail T. Accordingly, the line La is formed in the width direction of the nail area. The inclination detection unit 812b detects the degree of the inclination of the nail T based on the line image Lb obtained by imaging the line La from obliquely above.

Consequently, if the nail T is inclined due to the rotation of the finger about the axis in the extending direction, the degree of the inclination of the nail T can be detected relatively easily and reliably.

If the inclination detection unit 812b compares the height-wise positions of the two feature points Pp1 and Pp2 on the finger shape curve Lc to detect the degree of the inclination of the nail T, the degree of the inclination of the nail T can be detected reliably with a simple process.

If the inclination detection unit 812b evaluates the symmetry of the finger shape curve Lc in the width direction of the nail T to detect the degree of the inclination of the nail T, it is not always necessary to form the line La including the feature point Pp and acquire the line image Lb including the feature point Pp. In other words, as long as the finger shape curve Lc with some width including the center point (W/2) in the width direction of the nail T can be calculated, left-right symmetry can be determined. In this case, even if, for example, the feature point Pp is difficult to obtain due to reasons such as a special shape of the nail T, the degree of the inclination of the nail T can be detected appropriately.

The method in which the height-wise positions of the feature points Pp are compared, and the method in which symmetry in the width direction of the nail T is evaluated may be used in combination to determine the degree of the inclination of the nail T. In that case, the degree of the inclination of the nail T can be detected more reliably.

In the embodiment, it is configured such that a message is displayed on the display unit 26 or the like to notify the user, if it is the case, that the degree of the inclination of the nail T detected by the inclination detection unit 812b exceeds the range where the drawing data correction unit 813a can correct drawing data. Hence, it is possible to prevent the occurrence of a failure in nail printing by drawing without being aware of the state where the nail T is inclined.

An embodiment to which the present invention can be applied is not limited to the above-mentioned embodiment, and can be changed within a scope that does not depart from the spirit of the present invention as appropriate.

For example, in the above embodiment, the case has been illustrated by example in which the drawing control unit 815 forms only one (single) line La at one location having a maximum width in the width direction of the nail T, or its vicinity, within the nail area, and the inclination detection unit 812b detects the degree of the inclination of the nail T based on the line image Lb obtained by imaging the line La. However, the detection of the degree of the inclination of the nail T by the inclination detection unit 812b is not limited to this.

For example, a plurality of lines La is formed along the width direction of the nail T. The imaging unit 50 is caused to image the plurality of lines La to acquire a plurality of line images Lb. The degree of the inclination of the nail T may be detected based on the plurality of line images Lb.

If the number of line images Lb targeted for detection is increased, it becomes possible to acquire a more detailed three-dimensional shape of the nail T. The drawing data is corrected based on the acquired shape. Accordingly, it becomes possible to draw very finely on the nail T.

In the embodiment, the cases have been illustrated by example of taking an image for detecting the outline and the like of the nail T with one camera 51 and of taking an image for obtaining the line image Lb. However, it is not limited to the configuration in which an image is taken by only one camera. For example, a first camera for obtaining the line image Lb may be placed in the back of the apparatus, and a second camera that acquires an image for detecting the outline and the like of the nail T may be placed, for example, directly above the nail T separately from the first camera.

In the embodiment, the case has been illustrated by example in which the line light is applied by the light application unit 55 to draw and form the inclination detection purpose line La. However, the means for forming the line La is not limited to the light application unit 55. For example, the line La may be formed by drawing a straight line in the width direction on the surface of the nail T with drawing tools such as the drawing head 41 and the drawing tool 71.

In this case, for example, the line La may be drawn using an ink of a color (for example, white) that acts as a background (base coat) of a nail design to be drawn on the nail T.

In such a case, there is no need to remove the line La before drawing the nail design on the nail T. The nail design can be drawn subsequent to the process of detecting the degree of the inclination of the nail T.

Furthermore, a straight line may be drawn on the surface of the nail T with an ink that emits light and becomes visible when predetermined light is applied, such as an ultraviolet light-emitting clear coat, to form the inclination detection purpose line La.

In this case, a light source that can apply light with a predetermined intensity for causing the coat to emit light (for example, a black light that applies ultraviolet light) is included in the apparatus. When the line La is imaged to obtain the line image Lb, the predetermined light is applied to the surface of the nail T by the light source to take an image while the line La is emitting light.

In such a case, the line La is invisible under a normal state (that is, a state where the light is not applied by the predetermined light source), there is no need to remove the line La before drawing a nail design on the nail T. The nail design can be drawn subsequent to the process of detecting the degree of the inclination of the nail T.

In the embodiment, the case has been illustrated by example in which the camera 51 and the light application unit 55 are attached to the moving stage 56 and are configured to be movable in the Y direction (that is, the front-and-back direction of the drawing apparatus 1). However, that the camera 51 and the light application unit 55 are configured to be movable is not an essential element of the present invention. For example, the light application unit 55 may be placed in a fixed manner at a position where the line light can be applied to the nail T, and the camera 51 may be placed in a fixed manner at a position where a line formed by the line light can be imaged from obliquely above.

In the embodiment, the case has been illustrated by example in which the drawing apparatus 1 is a hybrid nail printing apparatus including, as drawing tools, the inkjet drawing head 41 and the drawing tools 71. However, the drawing apparatus is not limited to this. For example, it may be a plotter nail printing apparatus including only the drawing tools 71 or a nail printing apparatus including only the inkjet drawing head.

Up to this point some embodiments of the present invention have been described. However, the scope of the present invention is not limited to the above-mentioned embodiments, and includes the scope of the invention described in the claims and its equivalent.

What is claimed is:

1. A drawing apparatus comprising:
    a mounting section where an object is mounted, the object being a finger or a toe having a nail; and
    a processor configured to acquire a degree of an inclination of the nail generated by a rotation about an axis in a direction intersecting a width direction of the nail based on changes in height along the width direction of a location where at least one target image on the nail is formed, the changes having been acquired based on a target picture in which the target image formed along the width direction of the nail is imaged, the target image being formed in a region including a surface of the nail on the object mounted on the mounting section, the target image being formed in a plane extending in a first direction, and the target picture having been imaged from a second direction that is different from the first direction,
    wherein:
    the mounting section includes a mounting surface on top of which the object is to be mounted,
    the first direction is at a first angle with respect to a plane direction of the mounting surface,
    the second direction is at a second angle that is different from the first angle with respect to the plane direction of the mounting surface, and
    the processor:
    calculates an object shape curve indicating a widthwise change of the location where the target image of the object is formed, based on a profile of the target image in the width direction in the target picture, and a difference between the first angle and the second angle, and
    acquires an evaluation value corresponding to the degree of the inclination of the nail based on a profile of the object shape curve in the width direction, the evaluation value indicating a degree of symmetry of the object shape curve relative to a center thereof in the width direction, and exhibiting a smaller value when the degree of symmetry is higher.

2. The drawing apparatus according to claim 1, further comprising:
    a target image formation unit configured to draw the target image on the object from the first direction and form the target image,
    wherein:
    the target image formation unit includes a light application unit configured to apply line light formed into a line to the object from the first direction, and
    the target image formation unit applies the line light to the object by the light application unit and forms a line-shaped image on the object as the target image.

3. The drawing apparatus according to claim 1, further comprising:
    a target image formation unit configured to draw the target image on the object from the first direction and form the target image; and a drawing unit configured to draw on the nail,
wherein:
the drawing unit is also used as the target image formation unit, and
the target image formation unit forms a line-shaped image on the object by the drawing unit as the target image.

4. The drawing apparatus according to claim 1, wherein:
the processor acquires, as the evaluation value, a first specific value corresponding to a degree of a difference between a first shape on one side of the object shape curve across a center in a width of the object shape curve and a second shape on the other side of the object shape curve across the center, the first specific value becoming larger as the difference between the first shape and the second shape is increased.

5. The drawing apparatus according to claim 4, wherein:
the processor:
   determines that the degree of the inclination of the nail is within an allowable range in a case where the first specific value is equal to or less than a predetermined first threshold value, and
   determines that the degree of the inclination of the nail exceeds the allowable range in a case where the first specific value is larger than the first threshold value, and
the drawing apparatus further comprises a notification unit configured to notify of a matter in which the degree of the inclination of the nail exceeds the allowable range in a case where the processor determines that the degree of the inclination of the nail exceeds the allowable range.

6. The drawing apparatus according to claim 5, wherein the processor is further configured to correct drawing data corresponding to a design image selected by a user, in accordance with the degree of the inclination of the nail,
   wherein the first threshold value is set to a value corresponding to a range of the degree of the inclination where the drawing data is correctable by the processor.

7. A method for acquiring inclination of a nail in a drawing apparatus, wherein the drawing apparatus includes a mounting section where an object is mounted, the object being a finger or a toe having the nail, the method comprising:
   acquiring a degree of an inclination of the nail generated by a rotation about an axis in a direction intersecting a width direction of the nail based on changes in height along the width direction of a location where at least one target image of the nail is formed, the changes having been acquired based on a target picture in which the target image formed along the width direction of the nail is imaged, the target image being formed in a region including a surface of the nail on the object mounted on the mounting section along the width direction, the target image being formed on a plane extending in a first direction, and the target picture having been imaged from a second direction that is different from the first direction,
wherein:
the mounting section includes a mounting surface on top of which the object is to be mounted,
the first direction is at a first angle with respect to a plane direction of the mounting surface,
the second direction is at a second angle that is different from the first angle with respect to the plane direction of the mounting surface, and
said acquiring the degree of the inclination includes:
   calculating an object shape curve indicating a widthwise change of the location where the target image of the object is formed, based on a profile of the target image in the width direction in the target picture, and a difference in the angles of the first and second directions relative to the plane direction of the mounting surface, and
   acquiring an evaluation value corresponding to the degree of the inclination of the nail based on a profile of the object shape curve in the width direction, the evaluation value indicating a degree of symmetry of the object shape curve relative to a center thereof in the width direction, and exhibiting a smaller value when the degree of symmetry is higher.

8. The method for acquiring inclination of a nail according to claim 7, wherein said acquiring the degree of the inclination further includes acquiring, as the evaluation value, a first specific value corresponding to a degree of a difference between a first shape on one side of the object shape curve across a center in a width of the object shape curve and a second shape on the other side of the object shape curve across the center, the first specific value becoming larger as the difference between the first shape and the second shape is increased.

9. The method for acquiring inclination of a nail according to claim 8, wherein:
said acquiring the degree of inclination further includes:
   performing a first determination of determining that the object is mounted appropriately on the mounting surface and the degree of the inclination in the width direction of the nail is within an allowable range in a case where the first specific value is equal to or less than a predetermined first threshold value, and
   performing a second determination of determining that the object is inclined with respect to a state of being mounted appropriately on the mounting surface and the degree of the inclination of the nail exceeds the allowable range in a case where the first specific value is larger than the first threshold value, and
the method further comprises notifying of a matter in which the degree of the inclination of the nail exceeds the allowable range in a case where the degree of the inclination of the nail exceeds the allowable range in the second determination.

10. The method for acquiring inclination of a nail according to claim 9, further comprising correcting drawing data corresponding to a design image selected by a user, in accordance with the inclination of the nail,
   wherein the first threshold value is set to a value corresponding to a range of the inclination where the drawing data is correctable.

11. A drawing apparatus comprising:
a mounting section including a mounting surface on top of which an object is mounted, the object being a finger or a toe having a nail; and
a processor configured to acquire a degree of an inclination of the nail based on a shape of at least one target image along a width direction of the nail, the target image being formed along the width direction of the nail on the object mounted on the mounting section,
   wherein the target image is formed astride a surface of the nail and a surface of a skin portion of the object touching an end of the nail in the width direction, the target image being formed on a plane extending in a first direction that is at a first angle with respect to a plane direction of the mounting surface, and
   wherein the processor:

acquires a target picture by imaging the target image from a second direction at a second angle different from the first angle with respect to the plane direction of the mounting surface, calculates an object shape curve which indicates changes of the object in a plane extending in a direction orthogonal to the plane direction of the mounting surface along the width direction at a location where the target image is formed, including a location where the end of the nail in the width direction touches the skin portion of the object based on the shape of the target image along the width direction in the target picture and a difference between the first angle and the second angle, extracts at least one feature point indicating a change in curvature corresponding to the location where the end of the nail in the width direction touches the skin portion of the object on the object shape curve, and acquires, as an evaluation value, a second specific value based on a position in the direction orthogonal to the plane direction of the mounting surface of the feature point on the object shape curve, the second specific value becoming smaller as the position becomes closer to a reference state, and corresponding to the degree of the inclination of the nail.

12. A drawing apparatus comprising:
a mounting section where an object is mounted, the object being a finger or a toe having a nail;
a processor configured to acquire a degree of an inclination of the nail generated by a rotation about an axis in a direction intersecting a width direction of the nail based on changes of height along the width direction of a location where the target image of the nail is formed, the changes having been acquired based on a target picture imaging at least one target image formed along the width direction of the nail, the target image being formed in a region including a surface of the nail on the object mounted on the mounting section, the target image being formed on a plane extending in a first direction, and the target picture having been imaged from a second direction that is different from the first direction; and
a target image formation unit configured to draw the target image on the object from the first direction and form the target image,
wherein:
the target image formation unit includes a light application unit configured to apply line light formed into a line to the object from the first direction,
the target image formation unit applies the line light to the object by the light application unit and forms a line-shaped image on the object as the target image,
the target image is formed astride the surface of the nail and a surface of a skin portion of the object touching an end of the nail in the width direction,
the mounting section includes a mounting surface on top of which the object is mounted,
the first direction is at a first angle with respect to a plane direction of the mounting surface,
the second direction is at a second angle that is different from the first angle with respect to the plane direction of the mounting surface, and
the processor:
calculates an object shape curve indicating changes of a position of the object in the direction intersecting the plane direction of the mounting surface along the width direction at the location where the target image is formed, including a location where the end of the nail in the width direction touches the skin portion of the object based on the shape of the target image along the width direction in the target picture and a difference between the first angle and the second angle, extracts at least one feature point indicating a change in curvature corresponding to the location where the end of the nail in the width direction touches the skin portion of the object on the object shape curve, and acquires, as an evaluation value, a second specific value based on positions, in the direction orthogonal to the plane direction of the mounting surface, of the feature point on the object shape curve, the second specific value becoming smaller as the positions become closer to each other, and corresponding to the degree of the inclination of the nail.

13. The drawing apparatus according to claim 12, wherein:
the processor:
calculates, as the second specific value, a value of a difference in position in the direction intersecting the plane direction of the mounting surface between a first feature point and a second feature point in a case where the processor extracts the first feature point and the second feature point on the object shape curve, the first feature point and the second feature point corresponding to locations where both ends of the nail in the width direction touch the skin portion of the object,
determines that the degree of the inclination of the nail is within an allowable range in a case where the second specific value is equal to or less than a predetermined second threshold value, and
determines that the degree of the inclination of the nail exceeds the allowable range in a case where the second specific value is larger than the second threshold value, and
the drawing apparatus further comprises a notification unit configured to notify of a matter in which the degree of the inclination of the nail exceeds the allowable range in a case where the processor determines that the degree of the inclination of the nail exceeds the allowable range.

14. The drawing apparatus according to claim 13, wherein the processor is further configured to correct drawing data corresponding to a design image selected by a user, in accordance with the degree of the inclination of the nail, and
wherein the second threshold value is set to a value corresponding to a range of the degree of the inclination where the drawing data is correctable by the processor.

15. A method for acquiring inclination of a nail in a drawing apparatus, wherein the drawing apparatus includes a mounting section where an object is mounted, the object being a finger or a toe having the nail, the method comprising:
acquiring a degree of an inclination of the nail generated by a rotation about an axis in a direction intersecting a width direction of the nail based on changes of height along the width direction of a location where the target image of the nail is formed, the changes having been acquired based on a target picture in which the target image formed along the width direction of the nail is imaged, the target image being formed in a region including a surface of the nail on the object mounted on the mounting section along the width direction, the target image being formed on a plane extending in a first direction, and the target picture having been imaged from a second direction that is different from the first direction, wherein:

the target image is formed astride the surface of the nail and a surface of a skin portion of the object touching an end of the nail in the width direction, the mounting section includes a mounting surface on top of which the object is to be mounted, the first direction is at a first angle with respect to a plane direction of the mounting surface, the second direction is at a second angle that is different from the first angle with respect to the plane direction of the mounting surface, and said acquiring the degree of the inclination includes:

calculating a curve as an object shape curve, the curve indicating the changes of a position of the object in a direction orthogonal to the plane direction of the mounting surface along the width direction at a location where the target image is formed, including a location where the end of the nail in the width direction touches the skin portion of the object based on the shape of the target image along the width direction in the target picture and a difference between the first angle and the second angle, extracting at least one feature point indicating a change in curvature corresponding to the location where the end of the nail in the width direction touches the skin portion of the object, on the object shape curve, and acquiring, as an evaluation value, a second specific value based on positions, in the direction orthogonal to the plane direction of the mounting surface, of the feature point on the object shape curve and becoming smaller as the positions become closer to each other, and corresponding to the degree of the inclination of the nail.

16. The method for detecting inclination of a nail according to claim 15, wherein:

said acquiring the degree of the inclination further includes:

calculating, as the second specific value, a value of a difference in position in the direction orthogonal to the plane direction of the mounting surface between a first feature point and a second feature point in a case where the first feature point and the second feature points on the object shape curve are being extracted, the first feature point and the second feature points corresponding to locations where both ends of the nail in the width direction touch the skin portion of the object, performing a first determination of determining that the object is mounted appropriately on the mounting surface and the degree of the inclination of the nail is within an allowable range in a case where the second specific value is equal to or less than a predetermined second threshold value, and performing a second determination of determining that the object is inclined with respect to a state of being mounted appropriately on the mounting surface and the degree of the inclination of the nail exceeds the allowable range in a case where the second specific value is larger than the second threshold value, and the method further comprises notifying of a matter in which the degree of the inclination of the nail exceeds the allowable range in a case where the second determination has determined that the degree of the inclination of the nail exceeds the allowable range.

17. The method for acquiring inclination of a nail according to claim 16, further comprising correcting drawing data corresponding to a design image selected by a user, in accordance with the degree of the inclination of the nail, wherein the second threshold value is set to a value corresponding to a range of the degree of the inclination where the drawing data is correctable.

* * * * *

UNITED STATES PATENT AND TRADEMARK OFFICE
CERTIFICATE OF CORRECTION

PATENT NO. : 9,799,116 B2  
APPLICATION NO. : 15/064425  
DATED : October 24, 2017  
INVENTOR(S) : Shigeru Kafuku It is certified that error appears in the above-identified patent and that said Letters Patent is hereby corrected as shown below:

Column 29, Line 38 (Claim 16, Line 1), change "detecting" to -- acquiring --.

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*